(12) United States Patent
Sewell et al.

(10) Patent No.: US 7,191,943 B2
(45) Date of Patent: Mar. 20, 2007

(54) ROBUST BARCODE AND READER FOR ROD POSITION DETERMINATION

(75) Inventors: Roger Fane Sewell, Newnham (GB); Robert Jones, Cambridge (GB)

(73) Assignee: Caterpillar Inc, Peoria, IL (US)

( * ) Notice: Subject to any disclaimer, the term of this patent is extended or adjusted under 35 U.S.C. 154(b) by 307 days.

(21) Appl. No.: 10/900,197

(22) Filed: Jul. 28, 2004

(65) Prior Publication Data
US 2006/0022047 A1 Feb. 2, 2006

(51) Int. Cl.
*G06K 7/10* (2006.01)
*G06K 7/14* (2006.01)

(52) U.S. Cl. .................. 235/454; 235/385; 705/22

(58) Field of Classification Search ............. 235/454, 235/385; 705/22
See application file for complete search history.

(56) References Cited

U.S. PATENT DOCUMENTS

| | | | |
|---|---|---|---|
| 4,602,242 A | 7/1986 | Kimura | |
| 4,631,519 A | 12/1986 | Johnston | |
| 4,701,615 A | 10/1987 | Schmitt | |
| 4,736,187 A | 4/1988 | Kibrick et al. | |
| 4,879,555 A | 11/1989 | Ichikawa et al. | |
| 4,901,073 A | 2/1990 | Kibrick | |
| 4,914,437 A | 4/1990 | Kibrick et al. | |
| 4,928,008 A | 5/1990 | Huggins et al. | |
| 4,951,048 A | 8/1990 | Ichikawa et al. | |
| 5,117,105 A | 5/1992 | Nagase et al. | |
| 5,171,983 A | 12/1992 | Roberts et al. | |
| 5,235,181 A | 8/1993 | Durana et al. | |
| 5,252,825 A | 10/1993 | Imai et al. | |
| 5,260,556 A | 11/1993 | Lake et al. | |
| 5,563,408 A | 10/1996 | Matsumoto et al. | |
| 5,576,535 A | 11/1996 | Oosterwijk et al. | |
| 5,693,935 A | 12/1997 | Hassler, Jr. et al. | |
| 5,739,911 A | 4/1998 | Holzapfel et al. | |
| 5,959,295 A | 9/1999 | Braun | |
| 6,097,490 A | 8/2000 | Holzapfel et al. | |
| 6,147,342 A | 11/2000 | Kucher | |

(Continued)

FOREIGN PATENT DOCUMENTS

| EP | 0 302 644 | 2/1989 |
|---|---|---|
| EP | 0 947 805 | 10/1999 |

*Primary Examiner*—Uyen-Chau N. Le
(74) *Attorney, Agent, or Firm*—Finnegan, Henderson, Farabow, Garrett&Dunner

(57) ABSTRACT

A barcode reader and processing circuitry are disclosed for identifying a position of a cylinder rod, for example, along a path of movement. The barcode is marked on a surface of the rod and constitutes a series of markings extending along a portion of the length of the rod. The markings represent encoded information based on numbers calculated with a random number generator, and are grouped into subsets, each of which corresponds to a particular rod position. A portion of the rod including a subset of barcode markings is exposed to light emitted from the reader. Light reflected off the barcode is sensed with an array of photosensors provided in the reader. The photosensors generate electrical signals, and using Bayesian probability, a likely subset of markings is determined corresponding to the received electrical signals. Once identified, the markings subset is associated with a location corresponding to the position of the rod. A barcode reader is also described that is relatively easy to assemble and provides uniform illumination of the barcode.

14 Claims, 20 Drawing Sheets

U.S. PATENT DOCUMENTS

| | | |
|---|---|---|
| 6,229,140 B1 | 5/2001 | Ishizuka |
| 6,342,697 B1 | 1/2002 | Nagai et al. |
| 6,452,159 B2 | 9/2002 | Holzapfel et al. |
| 6,512,589 B1 | 1/2003 | Rodi |
| 6,556,946 B2 | 4/2003 | Sewell |
| 6,607,128 B1 | 8/2003 | Schwartz et al. |
| 2001/0017349 A1 | 8/2001 | Holzapfel et al. |
| 2002/0195551 A1 | 12/2002 | Baxter et al. |
| 2004/0232234 A1 | 11/2004 | Zvezdine et al. |

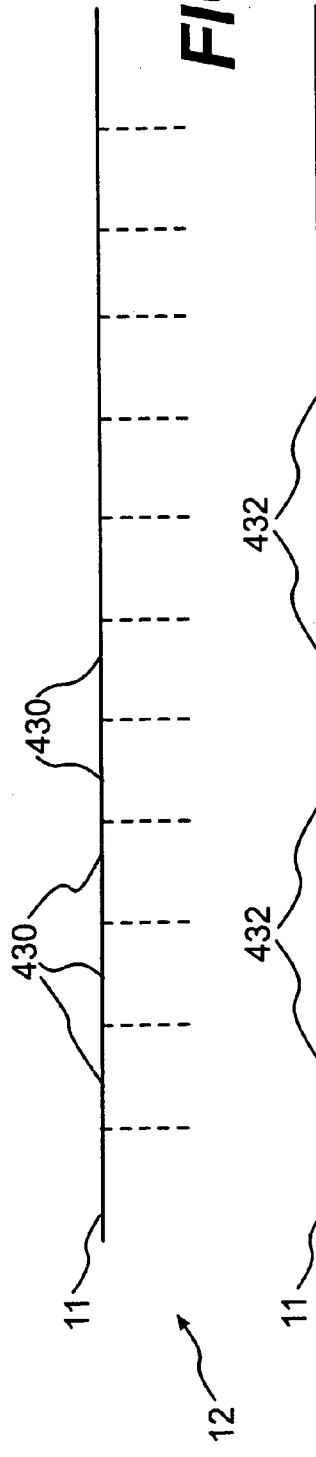
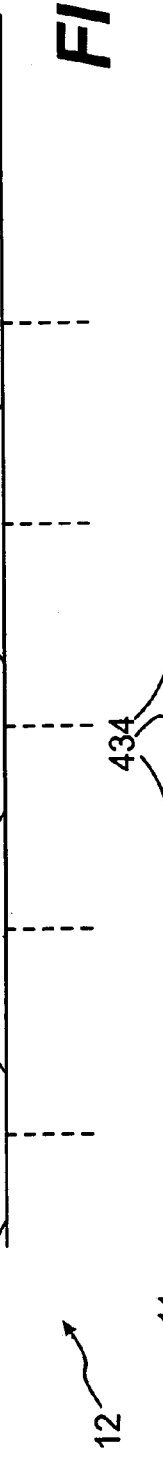
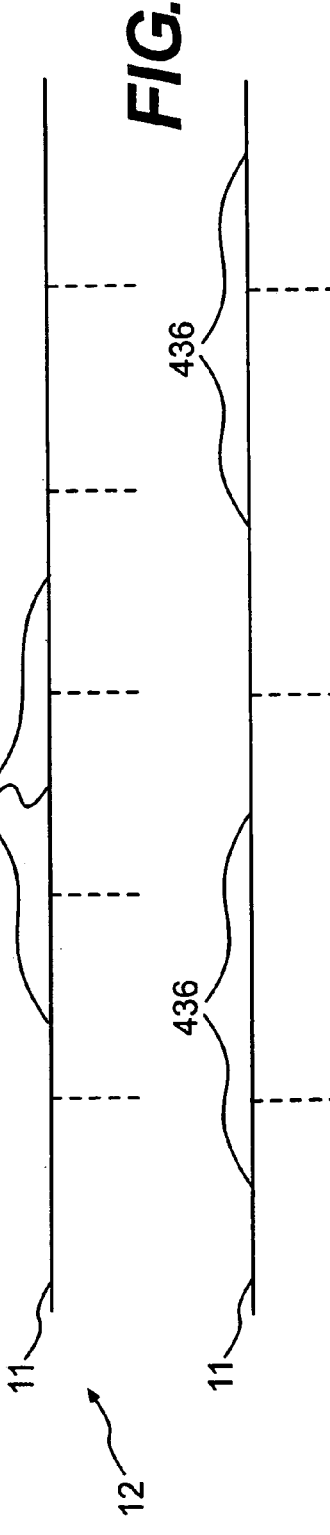
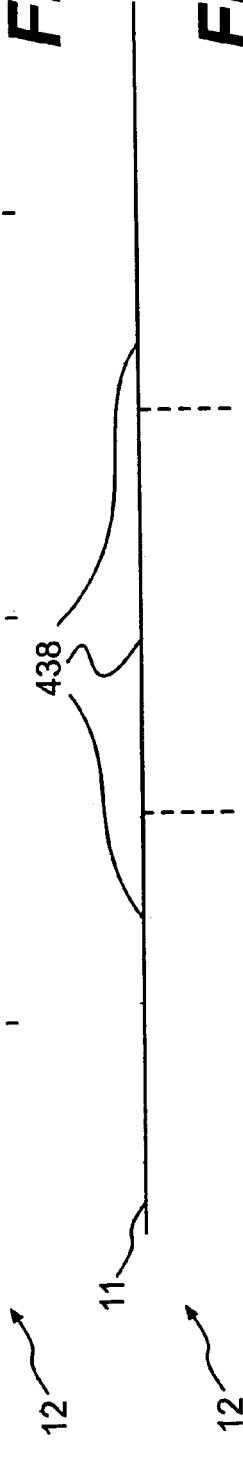

ROBUST BARCODE AND READER FOR ROD POSITION DETERMINATION

TECHNICAL FIELD

The present disclosure is directed generally to a system and related method for determining a location of a movable member, and more particularly, to determining the linear position of a movable member.

BACKGROUND

Many construction and earthmoving machines use a hydraulic or pneumatic cylinder for moving a work tool such as a bucket of a wheel loader or excavator. The cylinder includes a rod coupled to the work tool, at one end, and a chamber at the other. Hydraulic fluid is provided in the chamber to extend the rod along a linear path, typically extending several meters. The fluid can also be removed from the chamber to retract the rod along the same path. Often the rod location or position along the linear path must be known so that movement of the work tool can be controlled.

Barcodes have been marked on cylinder rods in order to locate the position of the rod. In particular, the rod may be marked with a barcode including non-repeating segments of code, each of which correspond to a different location of the rod. In operation, a sensor is provided in the cylinder adjacent the barcode to identify a particular segment, which is then associated with a corresponding rod location.

In order to locate a rod position with sufficient resolution, a relatively large number of code permutations are often provided over a substantial length of the rod. Such complex markings, however, typically require a relatively large amount of processing power to decode. Although processing power may be reduced with a less complex code, such simpler codes have a limited number of permutations and thus can only be used to determine rod location over a limited range of distances. Otherwise, the code repeats itself and would yield multiple locations for the same code segment.

U.S. Pat. No. 6,556,946 issued to Sewell on Apr. 29, 2003, describes a barcode utilizing a trinary code including a succession of data fields, each of which includes so-called "trits" or characters. Data is encoded by varying the relative amounts of black and white in each character. The barcode described in the Sewell patent facilitates accurate location measurements over a range of rod positions.

In Sewell, the barcode is exposed to either ambient light or light from an optical source. Light reflected off the barcode is detected by a sensor. Data present in the sensor output is read and the rod location is determined based on the data. In order to accurately sense the barcode described in Sewell, however, signals generated by the sensor should be relatively free of noise. Various non-idealities in the optics and electronics for sensing the barcode, however, as well as imperfections in the rod itself (e.g., spurious reflections on the rod surface and excess hydraulic fluid) can introduce noise into the sensor output signal. Often, the amount of noise can be substantial, and the rod location difficult to determine. Accordingly a more robust barcode, which is less susceptible to noise, is required to accurately identify rod positions.

SUMMARY OF THE INVENTION

In one aspect, the present disclosure is directed toward a method for encoding position information on a movable object, which includes a surface and a longitudinal axis. The method includes a step of determining an information carrying capacity of the movable object based upon a Shannon limit associated with a spatial bandwidth and an observable portion. In a further step, coded information indicative of a position of the movable object is generated. In an additional step, a plurality of markings are provided which extend axially on a portion of the surface of the rod in accordance with the coded information and the determined information carrying capacity. Consistent with a further aspect of the disclosure, a method is also provided for encoding position information on a movable object. The movable object includes a surface and a longitudinal axis. The method includes steps of generating coded information indicative of a position of the movable object, and providing a plurality of markings extending axially on a portion of the surface of the movable object in accordance with the coded information. The plurality of markings have an associated spectrum. The spectrum has first frequency components and second frequency components, and the providing step further includes a step of deemphasizing the first frequency components relative to the second frequency components.

In accordance with an additional aspect of the disclosure, a location monitoring system is provided which includes a movable member, reader circuit and processor circuit. The movable member is movable along a path, and has a surface with a plurality of markings disposed thereon. The reader circuit is configured to expose a part of the surface of the movable member, and generate a sense signal in response to a portion of the light emanating from the exposed part of the surface. The exposed part of the surface includes a subset of the plurality of markings.

The processor circuit is configured to receive the sense signal, and determine a plurality of probability values associated with the sense signal. Each of the plurality of probability values is associated with a corresponding subset of the plurality of markings. The processor identifies the subset of the plurality of markings included in the part of the surface based upon at least some of the plurality of probability values, and identifies a position of the movable member along the path corresponding to the identified subset of the plurality of markings.

In accordance with a further aspect of the disclosure, a location monitoring system is provided which includes a movable member, reader circuit and processor circuit. The movable member is movable along a path, and has a surface, and a plurality of markings disposed thereon. The movable member is locatable at a plurality of positions along the path. The reader circuit is configured to expose a part of the surface of the movable member, and is configured is to generate a sense signal in response to light emanating from the exposed part of the surface of the movable member.

The processor circuit is configured to receive the sense signal, and determine a plurality of first probability values associated with the sense signal. Each of the plurality of first probability values being associated with first locations on the surface, and each of the first locations being spaced from one another by a first distance. The processor circuit selects groupings of the plurality of first probability values, a sum of which exceeding a first predetermined threshold. The processor circuit further being configured to determine a plurality of second probability values, each of which being associated with second locations on the surface. Each of the second locations being spaced from one another by a second distance less than the first distance, and each of the second locations lying within regions of the surface defined by the selected groupings.

In accordance with an additional aspect of the disclosure, an apparatus is provided for reading an image provided on a surface. The apparatus comprises a photosensor and a lens. The lens is configured to receive light from the image and direct the light to the photosensor. The lens and photosensor are attached to a carrier. A housing is also provided having an external surface and an internal surface. The external surface has a first reference portion and the internal surface has a second reference portion, which is aligned with the first reference portion. The carrier is attached to the second reference portion such that upon the first reference portion being positioned at a predetermined distance away from the image, light is substantially focused onto the photosensor.

Consistent with a further aspect of the invention, an optical device is provided including a housing having an opening. A plurality of optical emitters are provided in the housing which are configured to output light through the opening. A circuit is also included to supply substantially the same electrical current to each optical emitter. In addition, a plurality of photosensors are provided in the housing for receiving a portion of the light reflected off a surface external to the housing.

BRIEF DESCRIPTION OF THE DRAWINGS

The accompanying drawings, which are incorporated in and constitute a part of this specification, illustrate several embodiments of the invention and together with the description, serve to explain the principles of the invention.

FIGS. 4B–4F illustrate regions of a rod surface discussed in connection with FIG. 4A;

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
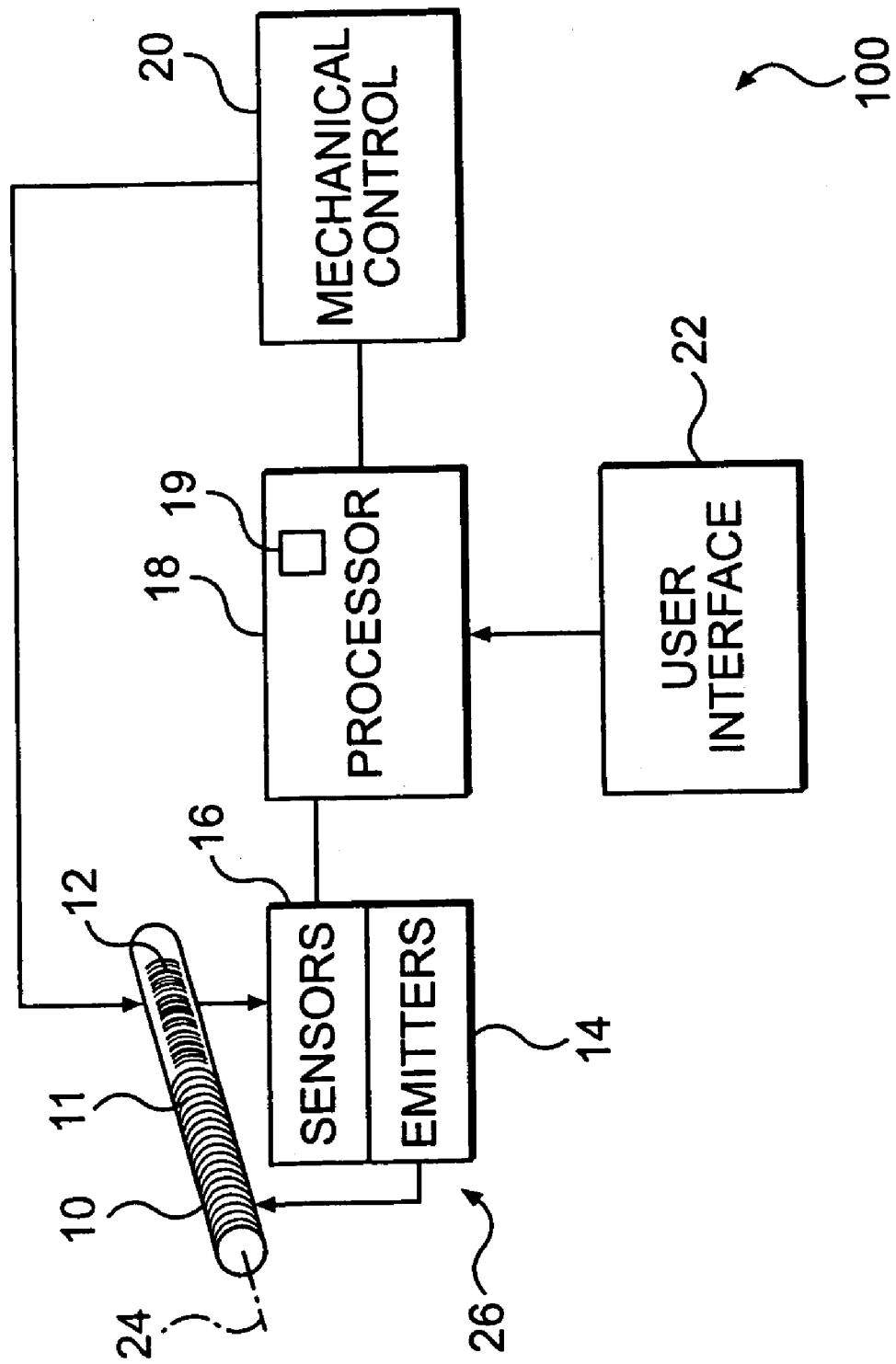
FIG. 1 illustrates a block diagram of a system for identifying a rod location consistent with an aspect of the present disclosure.

FIG. 1 illustrates a block diagram of system 100 for monitoring a position and controlling movement of movable member, object or rod 10. Rod 10 typically includes a conventional thermally sprayed outer surface 11 and a longitudinal axis 24. A plurality of markings 12 constituting a barcode are provided on outer surface 11, typically with a high intensity laser that selectively exposes portions of surface 11. Markings 12 represent binary coded information in the sense that the marks by being dark or light represent 0s or 1s (but this should not be confused with information about the position of the rod which is a more diffuse quantity). Reader circuit 26 includes one or more optical emitters 14, such as light emitting diodes (LEDs), that expose a portion of the outer surface 11 including a subset of markings to light typically at infrared frequencies, although other frequencies of light may be used as well. Light is reflected off or emanates from the exposed portion of outer surface 11 and is sensed by sensor 16, typically including an array of photosensors. Alternatively, markings may be provided on an internal surface of rod 10, and exposed from within. In that case, the rod may be transparent, and photosensors provided external to the rod would sense light passing through a portion of the internal surface of the rod instead of being reflected from it. The markings may also be observed from inside such a rod. In addition, rod 10 may be exposed with ambient light, if such light is of sufficient intensity.

Collectively, the photosensors (discussed in greater detail below) output a sense signal. Moreover, each photosensor, representing a pixel of a sensed barcode image, may have a viewing length of, for example, 63.5 microns, and since 128 such photosensors are typically provided in a linear array, an 8.1 mm section of outer surface 11 is typically sensed, although other lengths and other view pixel lengths are contemplated by the present disclosure.

In response to the received light, sensors 16 output electrical signals to processor circuit 18, which may be a conventional microprocessor, computer, or digital signal processor and associated circuitry. Processor circuit 18, in turn, determines a position of rod 10 and information concerning the position is optionally displayed on a user interface device 22 including, for example, a display or monitor. In addition, a keyboard or other data entry device may be provided, and in response to commands input to the processor circuit 18 and the identified position, processor circuit 18 supplies control signals to mechanical control circuit 20, to thereby move or change the location of rod 10.

Consistent with an aspect of the disclosure, processor 18 executes instructions for carrying out or performing a method of identifying a location of rod 10, such as the method described below in connection with FIG. 8 or the method discussed below in connection with FIG. 16. Such instructions may be read into a computer readable medium, such as memory 19 incorporated into or provided external to processor 18. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium or combination of media that participates in providing instructions to processor 18 for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics, and can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer or processor 18 can read.

Figure 2:
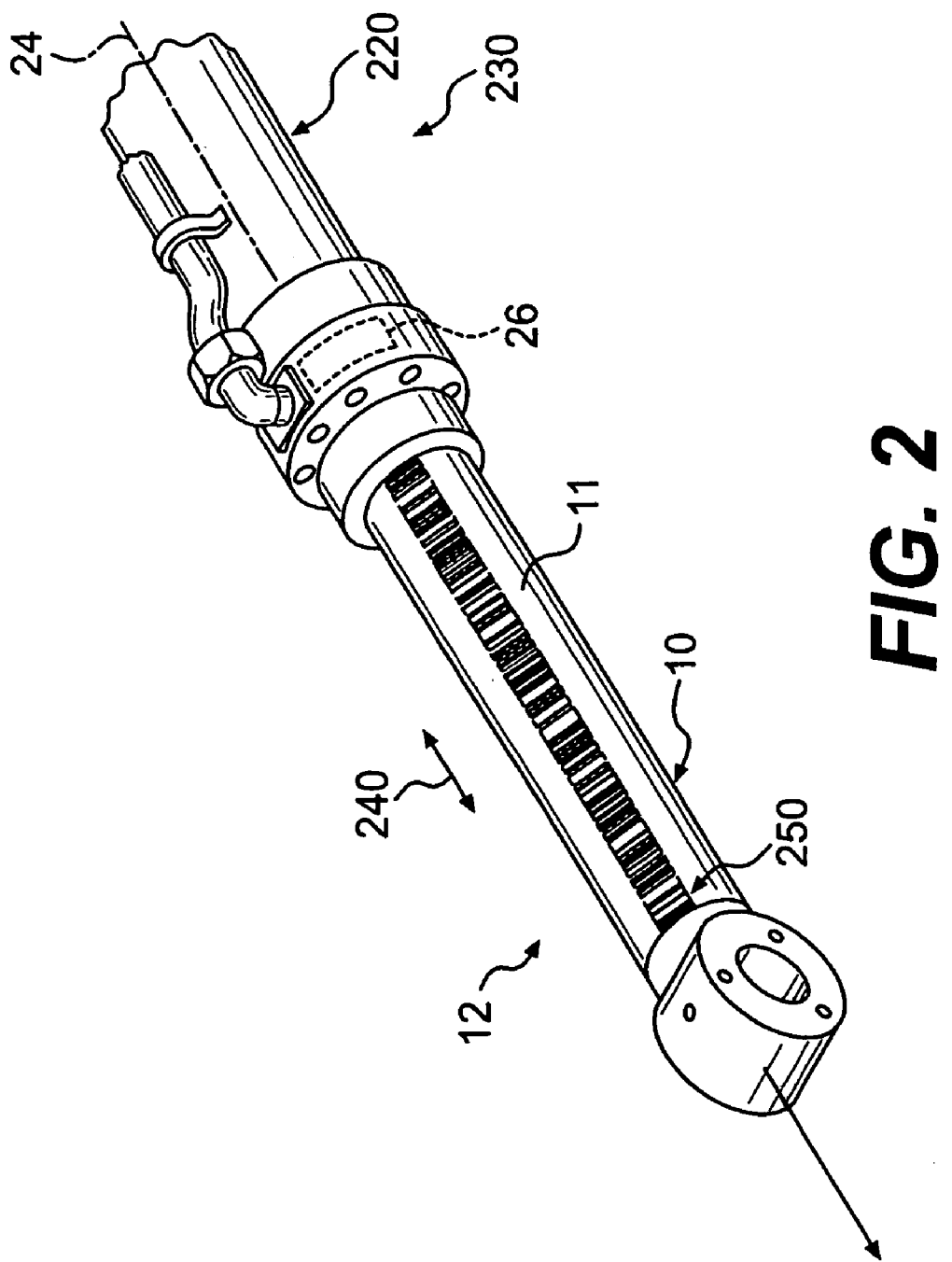
FIG. 2 illustrates a perspective view of a barcode provided on a rod in accordance with a further aspect of the present disclosure.

FIG. 2 illustrates rod 10 disposed in a cylinder body 220. Collectively, rod 10 and cylinder body 220 constitute a cylinder 230, which can be any one of a wide variety of hydraulic, pneumatic and similarly actuated cylinders. Cylinder 230 is operable to extend rod 10 from, and retract rod 10 into, cylinder body 220 typically along a linear path of movement represented by arrow 240. Path 240 typically extends axially with respect to a longitudinal axis 24. Optionally, reader circuit 26 may be provided in cylinder body 220.

In the embodiment shown in FIG. 2, rod 10 is movable while cylinder body 220 is stationary. The present disclosure, however, is applicable to other rod and cylinder body configurations whereby the rod is stationary and the cylinder body is movable, as well as configurations in which both the rod and cylinder body are movable. As used herein, the term "movable" refers to actual movement of the rod, member or object, as well as relative movement in configurations in which the rod, member or object is stationary but the reader circuit is movable, and configurations in which both the rod, member or object and the reader circuit are movable.

Markings 12 may include endpoints respectively provided adjacent corresponding ends of rod 10. For example, marking endpoint 250 is provided adjacent one end of rod 10, and another marking endpoint is located within cylinder body 220 adjacent the other end of rod 10, which, in the position shown in FIG. 2, is adjacent reader circuit 26.

Figure 9:
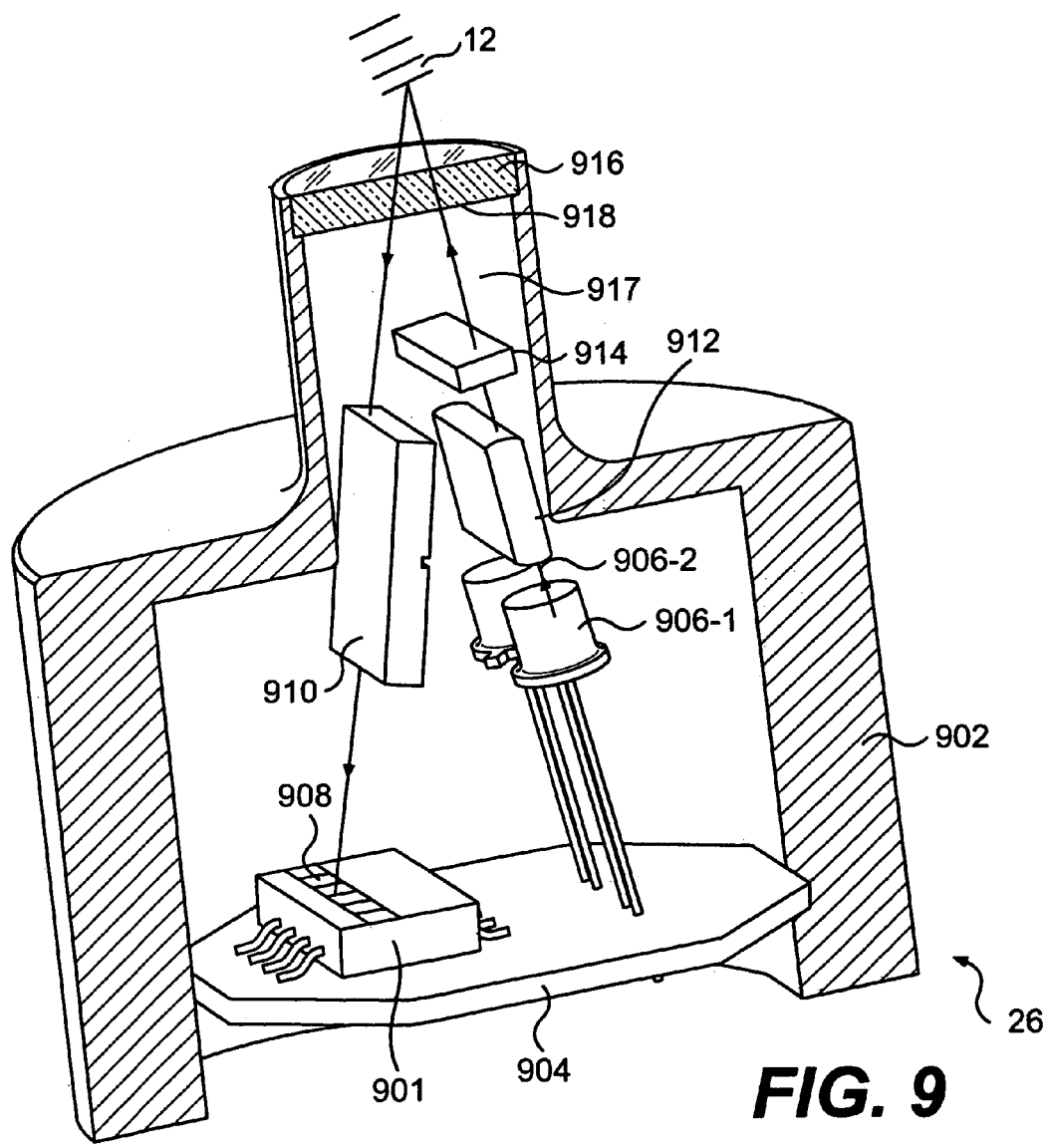
FIG. 9 illustrates a perspective view of a cross-section of a reader consistent with another aspect of the present disclosure.

Reader 26 will next be described with reference to FIGS. 9–12. FIG. 9 illustrates a cross-sectional perspective view of reader 26 including a housing 902 enclosing at least one optical emitter, e.g., light emitting diodes, LEDs 906-1 and 906-2 and an array of photosensors 908, including, for example, a linear array of CMOS photosensors. Sensors 908 and LEDs 906-1 and 906-2 are disposed on a carrier 904, which in a preferred configuration may include a circuit board upon which are mounted the local electronic components necessary for the operation of the sensor. Light emitted by LEDs 906-1 and 906-2 (represented by region 917) passes through cylindrical lens 912 and diffuser 914 and out through opening 916. Light reflected off a portion of barcode markings 12 (also represented by region 917) also passes through opening 916, and is collected by the lens 910 which forms an image of the barcode in the plane of the photosensors 908. In a preferred configuration, the lens 910 may include an array of graded index lenses known as a Selfoc Lens Array (SLA). The opening 916 may be closed by a planar transparent optical window 918 to provide protection for the sensor components. Circuitry 901 associated with CMOS sensors 908 receives outputs from the sensors and generates sense signals that are fed to processor 18. Optionally, sensor 908 may include 128 pixels on an 63.5 micron pitch, each pixel being 63.5×55.5 microns in size. Preferably, LEDs 906-1 and 906-2, photosensors 908 are formed integrally with carrier 904.

Figure 10:
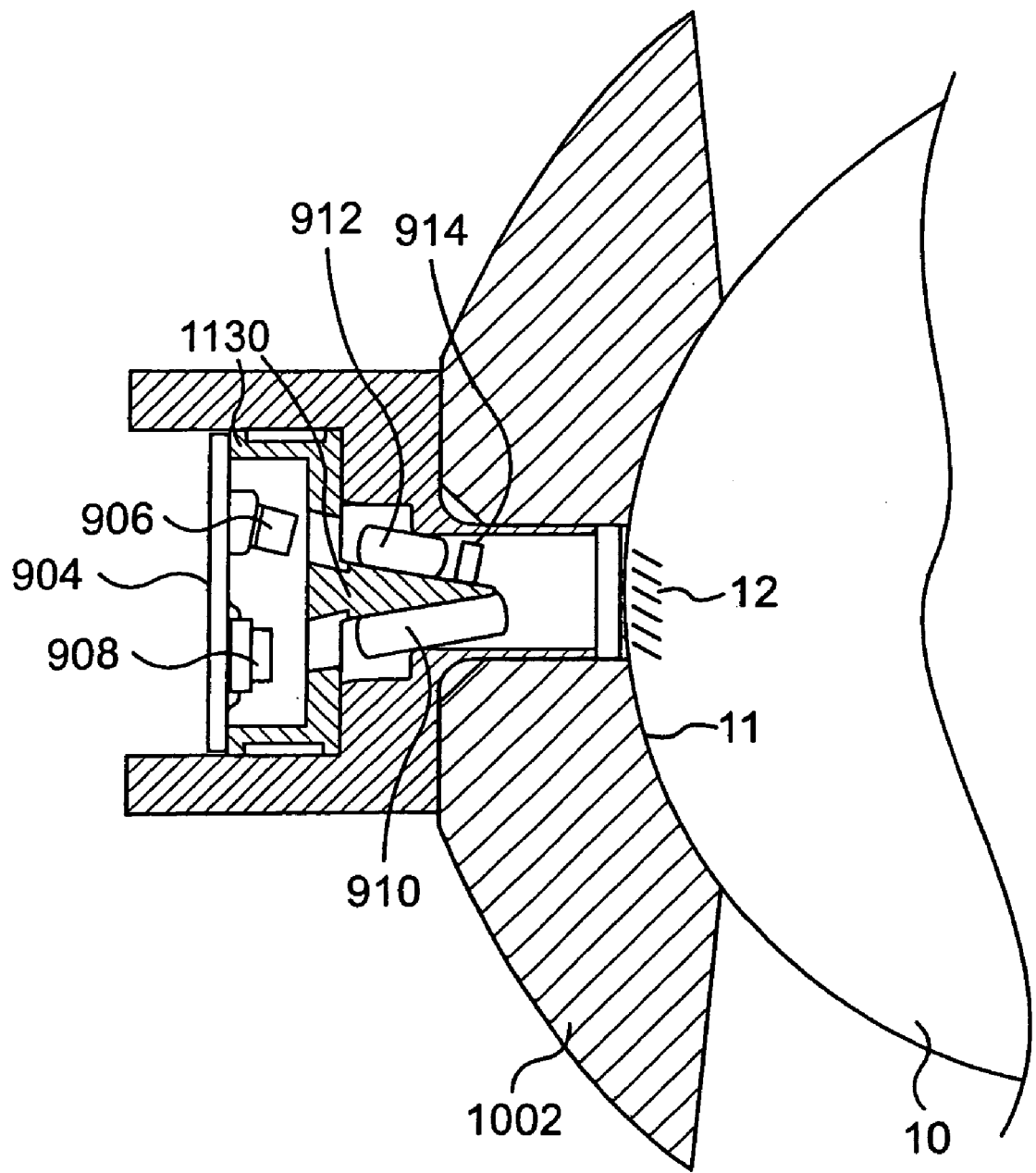
FIG. 10 illustrates an alternative cross-sectional view of the sensor consistent with the disclosure.

FIG. 10 illustrates a cross-sectional view of reader 26 when provided on rod 10. In particular, a casing 1002 is provided on rod 10 to hold reader 26. Casing 1002 has a predetermined thickness such that when the reader 26 (manufactured in accordance with the procedure described below) is mounted thereon, LEDs 906, photosensor and circuitry 901/908, lenses 910, 912 and diffuser 914 are provided at a desired distance from surface 11 of rod 10 to facilitate accurate illumination, focusing and sensing of optical signals reflected off barcode markings 12 without the need for adjustment.

Figure 11:
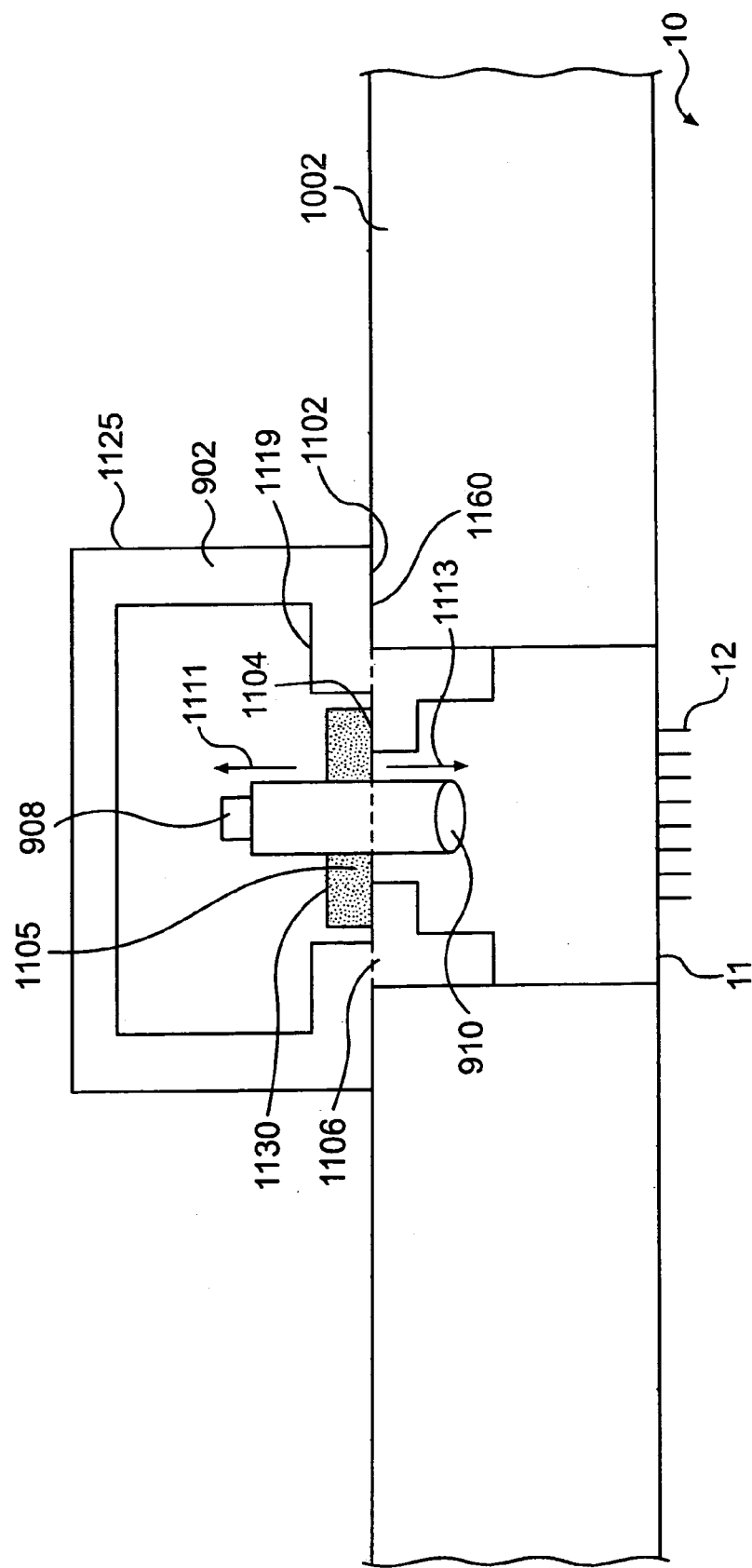
FIG. 11 is a diagram of the reader highlighting additional features in accordance with a further aspect of the present disclosure.

FIG. 11 shows a diagram of reader 26 in which various components shown in FIGS. 9 and 10 have been omitted for clarity and housing 902 has been redrawn to highlight a further aspect of the present disclosure. The features to be described with reference to FIG. 11 facilitate simple and precise assembly of the optical components contained therein to assure that barcode markings 12 are adequately exposed, and light reflected off the barcode is properly focused and sensed.

As further shown in FIG. 11, housing 902 includes an outer surface 1125 and inner surface 1119. Outer surface 1125 has a reference portion 1102 disposed on a portion 1160 of the casing 1002, a known distance from the scale or markings 12 on surface 11 of the rod 10. The inner surface has a reference portion 1104. An optical carrier 1130 is positioned by locating its reference surface 1105 against the housing internal reference surface 1104. The sensor components: (LEDs) 906-1, 906-2, CMOS sensors 901/908 (where these latter components may themselves be mounted on a sub-carrier circuit board described previously) illumination lens 912, diffuser 914, imaging lens 910 are mounted on the optical carrier 1130. The following mechanical reference chain relates the position of these components to that of the rod and hence the bar code (scale) to be measured: 1105 (optical carrier reference surface) to 1104 (sensor housing internal reference) to 1102 (sensor housing external reference) to 1160 (casing reference) to 12 (rod surface plus scale). This enables the sensor component (906-1, 906-2, 912, 914, 910, 901) to be located against appropriately positioned mechanical references machined on carrier 1130 such that they are optimally positioned to illuminate the bar code (scale) (using 906-1, 906-2, 912, 914) and to form an image of the illuminated scale in the plane at the CMOS detector array (901, 908) using the lenses 910. This enables the sensor to be assembled using a simple process of mechanical component location and installation on the casing 1002. As a result, markings 12 are optimally illuminated and imaged without the need for either external or internal adjustment.

Moreover, internal reference portion 1104 and external reference portion 1102 are aligned along reference line 1106, such that photosensor array 908 is provided above line 1106 in the drawing and lens 910 is provided below. Housing 902 is typically clamped to casing 1002 so that if the temperature in housing 902 increases, lens 910 will move in a direction indicated by arrow 1113, while photosensor array 908 will move in an opposite direction indicated by arrow 1111. As a result, at relatively high temperatures, lens 910 will move closer to markings 12, but photosensor array 908 will move farther away. Although the focal plane associated with lens 910 will shift in an opposite direction away from surface 11, so too will photosensor array 908. Thus, the image projected by lens 910 remains substantially focused and thermally induced blurring is minimized. In a similar fashion, blurring due to decreases in temperature is compensated by movement of the lens and photosensor array in directions opposite to those described above.

Barcode markings 12 constitute a series of variable width light and dark bands, and should preferably be illuminated with light having substantially uniform intensity over the exposure area of surface 11. Otherwise, for example, a light band of barcode markings 12 may be insufficiently illuminated and erroneously sensed as a dark bank, while a dark band receiving too much light may be incorrectly sensed as a light band. Thus, neither LED 906-1 nor LED 906-2 should be substantially brighter (or darker) than the other. In addition, since LEDs 906-1 and 906-2 are turned intermittently on for brief periods of time, during which light reflected off the rod surface is sensed, each LED should typically turn-off at substantially the same time so that light is not further sensed after an illumination period. LEDs 906-1 and 906-2 are typically turned on one every 10 ms for a duration of 25 microseconds to thereby minimize blurring distortions due to rod movement.

LEDs 906-1 and 906-2 should preferably receive the same amount of electrical current so that each has substantially the same luminosity. The LEDs, however, cannot be simply connected in parallel because slight variations in external wiring or internal LED variations (a difference of potentially 10-fold per 60 mV difference in applied voltage minus series resistance voltage drop) can result in substantial differences in current flow and thus brightness.

Figure 12:
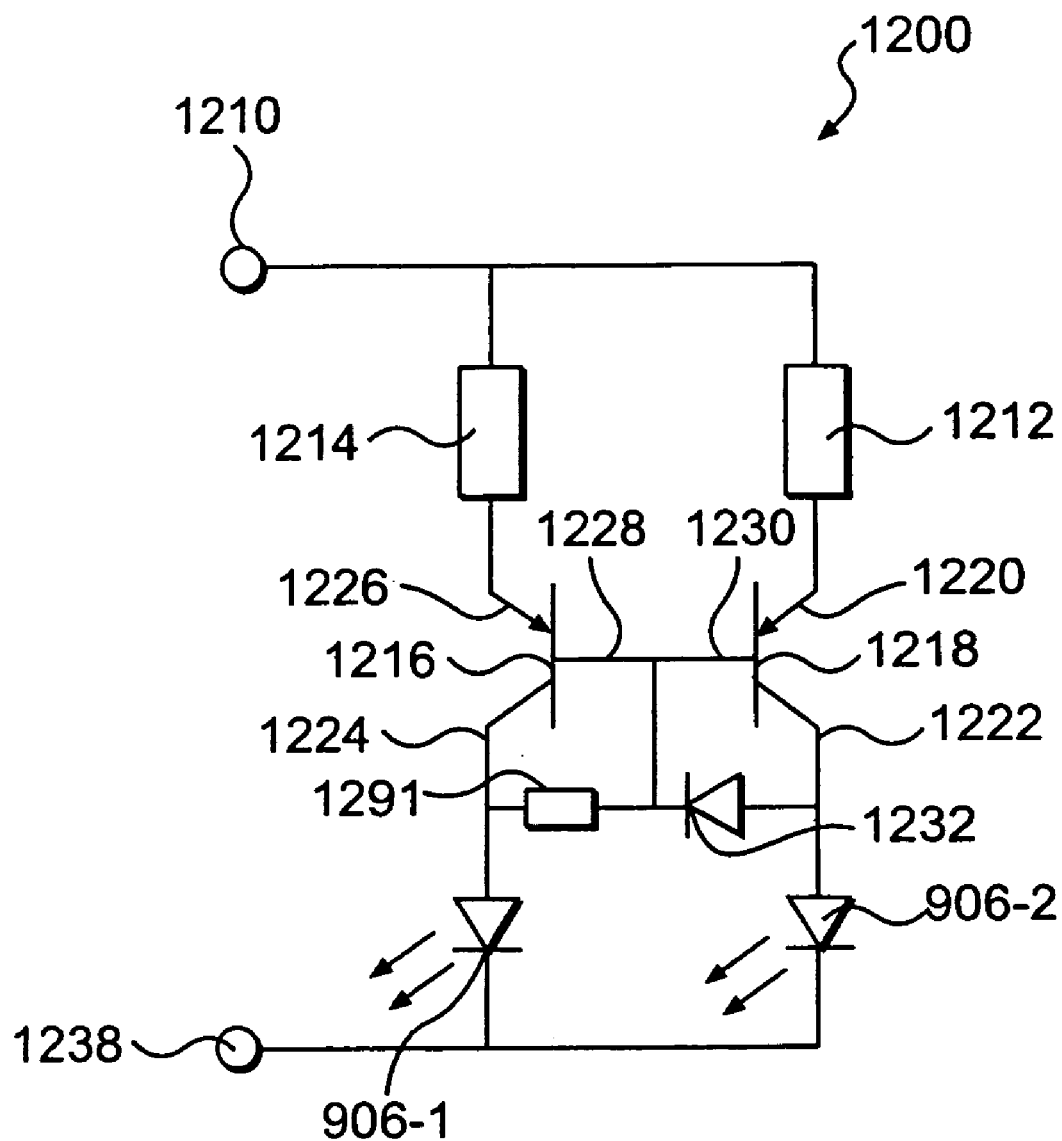
FIG. 12 illustrates a circuit for supplying current to barcode illuminating optical emitters in accordance with an additional aspect of the disclosure.

As shown in FIG. 12, circuit 1200 is provided in accordance with an aspect of the present invention to supply substantially the same current to both LEDs 906-1 and 906-2. Circuit 1200 may include bipolar transistors 1216 and 1218, both coupled to a common terminal 1210 through corresponding resistors 1214 and 1212 through emitters 1226 and 1220, respectively. Collectors 1224 and 1222 are respectively coupled to LEDs 906-1 and 906-2, and bases 1228 and 1230 are tied to one another. The cathodes of LEDs 906-1 and 906-1 are connected in common to terminal 1238. Terminal 1238 may be at ground potential, or any other suitable potential that is less than or more negative than the potential of terminal 1210. The bias across terminals 1210 and 1238 is intermittently applied to pass a current through LEDs 906-1 and 906-2.

Bases 1228 and 1230 may be coupled to a common constant current source so that transistors 1216 and 1218 can be rendered conductive or turned on. However, at relatively high currents, the series resistance of LEDs 906-1 and 906-2 can be substantial. In which case, transistors 1216 and/or 1218 can "saturate", whereby LEDs 906-1 and 906-2 cannot sink sufficient collector current, and charge builds-up in bases 1228 and/or 1230 of transistor 1216 and 1218, respectively. Once power is cutoff, however, e.g., terminal 1210 is set to a low potential, excess carriers or charges in base regions of transistors 1216 and 1218 flow from the collector and through LEDs 906-1 and/or 906-2, thereby extending turn-off time.

As further shown in FIG. 12, however, base 1228 is connected to emitter 1224 (though a resistor 1232 to be discussed in greater detail below). As a result, since base 1228 is 0.7 V below emitter 1226 (because the emitter-base junction is always forward biased during operation), the potential at collector 1224 will similarly be 0.7 V below the emitter. Under such biasing conditions, transistor 1216 will not saturate.

Although base 1230 may also be connected to collector 1222 to reduce the likelihood that transistor 1218 saturates, collectors 1222 and 1224 would be shorted in this instance, and provide a path through which current may be diverted from one LED to the other. Such current diversion and imbalance can take place when the series resistance, for example, of one device differs from the other, resulting in greater current flowing through the device having the least resistance.

To assure more balanced current flow, a Schottky diode 1232 may be connected across base 1230 and collector 1222, as shown. Since the cathode of diode 1232 is coupled to collector 1224, current flow from collector 1224 to collector 1222 is effectively blocked, and current is supplied, undiverted, to LED 906-1. Moreover, the voltage drop associated with diode 1232 is about 300 mV.

Thus, the potential at collector 1222 is −0.7 V (the base to emitter potential difference) less −0.3 V (the voltage drop associated with diode 1232), or −0.4 V (all relative to emitter 1220), which biases transistor 1218 out of saturation, as well.

However, if a potential difference greater than or equal to 0.3 V is applied across the anode and cathode of diode 1232, diode 1232 will typically conduct. Accordingly, variations in series resistance in LEDs 906-1 and 906-2 can render diode 1232 conductive so that current flow may be diverted from collector 1222 through diode 1232, and through LED 906-1, even though diode 1232 can block current diversion from collector 1224 to collector 1222.

Although diverted current through LED 906-1 may be difficult to eliminate entirely, such current can be reduced by connecting resistor 1291 between the collector 1224 and the common connection between bases 1228 and 1230 and the cathode of diode 1232. Resistor 1291 may have a resistance of 20 ohms, which is typically sufficient to increase the resistance of diverted current path through LED 906-1 so that most current flowing from collector 1222 flows undiverted through LED 906-2.

Thus, circuit 1200 provides substantially balanced current flow between LEDs 906-1 and 906-2 because of the equality of the emitter resistors 1212 and 1214 and the exponential control of collector current by base-emitter voltage via the Ebers-Moll equation, and also facilitates uniform turn-off for both LEDs to realize accurate sensing of the barcode markings.

Returning to FIGS. 9 and 10, photosensor array 908 is typically supplied with a clock signal to sequentially read each pixel of the array. The outputs from photosensor array 908 are fed to processor circuit 18 for determining rod location, as further discussed below.

Figure 3:
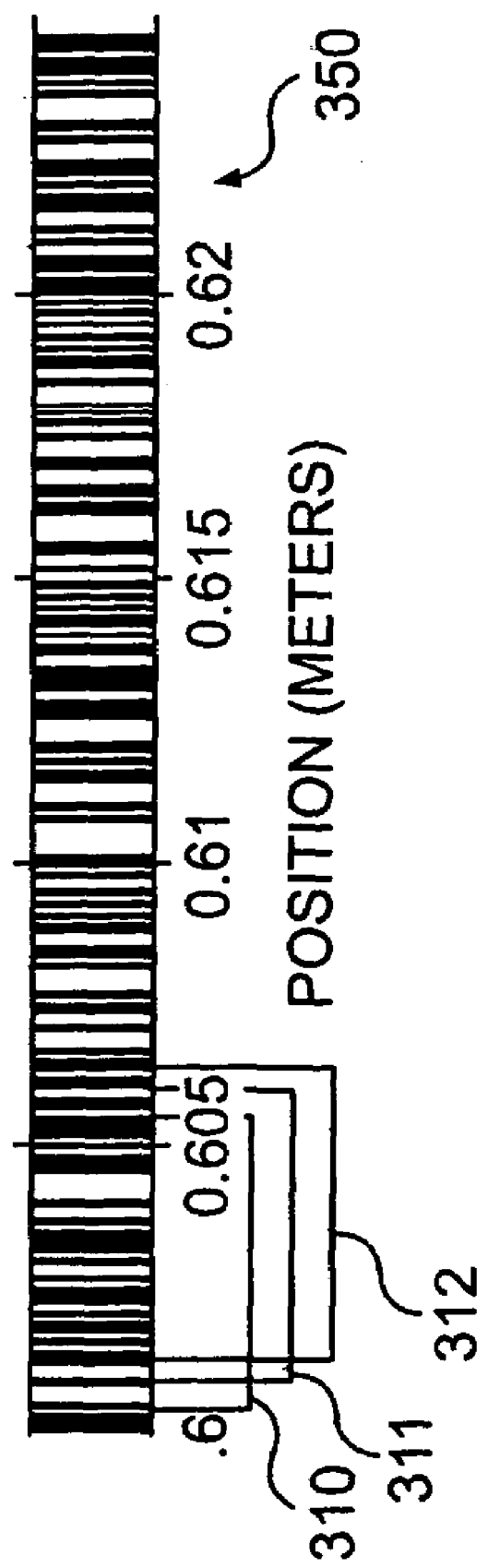
FIG. 3 illustrates an exemplary barcode consistent with an additional aspect of the present disclosure.

Turning to FIG. 3, a portion of barcode markings 12 is shown in greater detail. Barcode 12 includes a plurality of markings 350, which in this example include bands of various widths. The markings are grouped into marking subsets, three of which are shown as subsets 310, 311 and 312. Each marking subset corresponds to a particular rod location. In this case, subsets 310–312 correspond to rod locations 400 microns apart. A memory 19 in processor circuit 18 stores each barcode marking subset and corresponding rod position or location such that upon identifying a particular marking subset, the corresponding rod location can be readily identified.

A capacity of the encoded information in barcode 12 is based upon a Shannon limit associated with the code information. As generally understood, Shannon's theorem defines an amount of information that can be carried through a channel given a particular amount of noise present in the channel. The Shannon limit capacity C, in the formula below, is typically measured in bits per second, but in the context of the barcode of the present disclosure, C is indicative of bits per unit length of rod. For each channel with noise and non-infinite bandwidth, C is greater than or equal to the amount of information that can be communicated down the channel without errors. Moreover there is no smaller value than C with this property.

Generally, signals can be represented by a wave, e.g. a square wave, which is a superposition of multiple sinusoids, each having a particular wavelength and frequency. The collection of frequencies constitutes a bandwidth or spectrum. Here, if the channel carries a range of such frequencies and has an associated bandwidth W Hz (including both positive and negative frequencies) (meaning that it has unity gain for frequencies inside ±W and zero gain outside that range), and the channel is real rather than complex, then the channel capacity is given by $$C = W \log_2\left(1 + \frac{S}{N}\right)$$

where N is the noise power, and S the signal power. This version of the theorem assumes that the noise is white and Gaussian (i.e., the noise is Gaussian in that it is random but Gaussianly distributed about some mean value, and white in that noise associated with any one photosensor, for example, is not correlated to another photosensor and the distribution or variance in noise values for each photosensor is the same) and that both noise and signal are real.

If the signal to noise ratio is not constant across the bandwidth, the theorem is modified to read (hereinafter "Equation A")

$$C = \int_{-W}^{W} \log_2\left(1 + \frac{S(f)}{N(f)}\right) df$$

for a real channel.

Accordingly, the number of bits of information per meter of rod that can be sent through the channel with error probability approaching zero as code length increases to infinity cannot be greater than the capacity.

In the barcode consistent with the present disclosure, the signal-to-noise ratio is not-constant across the bandwidth. Moreover, the code length cannot be infinite; the reader typically senses portions of the rod only a few mm in length. In addition, the information encoded in the barcode is binary and thus constitutes a series of 1s and 0s, rather than arbitrary values in between. As noted above, in the example disclosed herein, the width of each rod pixel is 50 μm and a view width or an observable portion of surface 11 of the reader is about 8 mm which yields 160 transmitted bits per view, which is believed to be sufficiently long enough for Shannon's limit to apply.

In the exemplary embodiment described herein, the overall bandwidth (in this instance, the number of bits per mm) is 11.7 bits per mm, or about 93 bits total. Based on the above formulas and with a noise level corresponding to a received optical signal to noise ratio of −6 dB, the signal power is ¼ of the noise power, so that an information carrying capacity of approximately 30 bits can be expected, minus a reduction for non-idealities not accounted for by the theoretical assumptions of Shannon's theorem. The sensed information is expected to be sufficient to resolve the rod's location to within roughly one millionth of the length of the rod (excluding the effect of the reduction)—to about 5 μm—which was measured, but at a signal-to-noise ratio of −4.7 dB because of the reduction.

The disclosed methodology herein departs from the theoretical assumptions of Shannon's theorem in the following manner. The barcode pattern transmitted for a given position x is not independent of the pattern transmitted for position x+δ if δ<0.007 m. Accordingly, assumptions concerning white noise may not hold for such positions. Moreover, the noise is of unknown amplitude, as is the signal, so the parameters S/N in the above formulas are difficult to determine precisely. Further, Shannon's theorem requires long lengths of code in order to achieve the calculated capacity.

Moreover, as noted above, the basic form of Shannon's theorem assumes that the noise distribution for each frequency component in a channel is the same, or that the noise is "white." Although surface noise of rod 10, due to surface imperfections, is nearly white, light reflected off rod 10 is blurred by lenses 910, and the surface noise is thus spectrally shaped in a further departure from the assumptions of Shannon's theorem discussed above. In order to improve channel capacity, however, the spectrum associated with the barcode is correspondingly shaped to include spatial frequencies in proportion to the extent to which they are not blocked by lens 910, to thereby substantially conform to the spectrum of lens 910.

Figure 13:
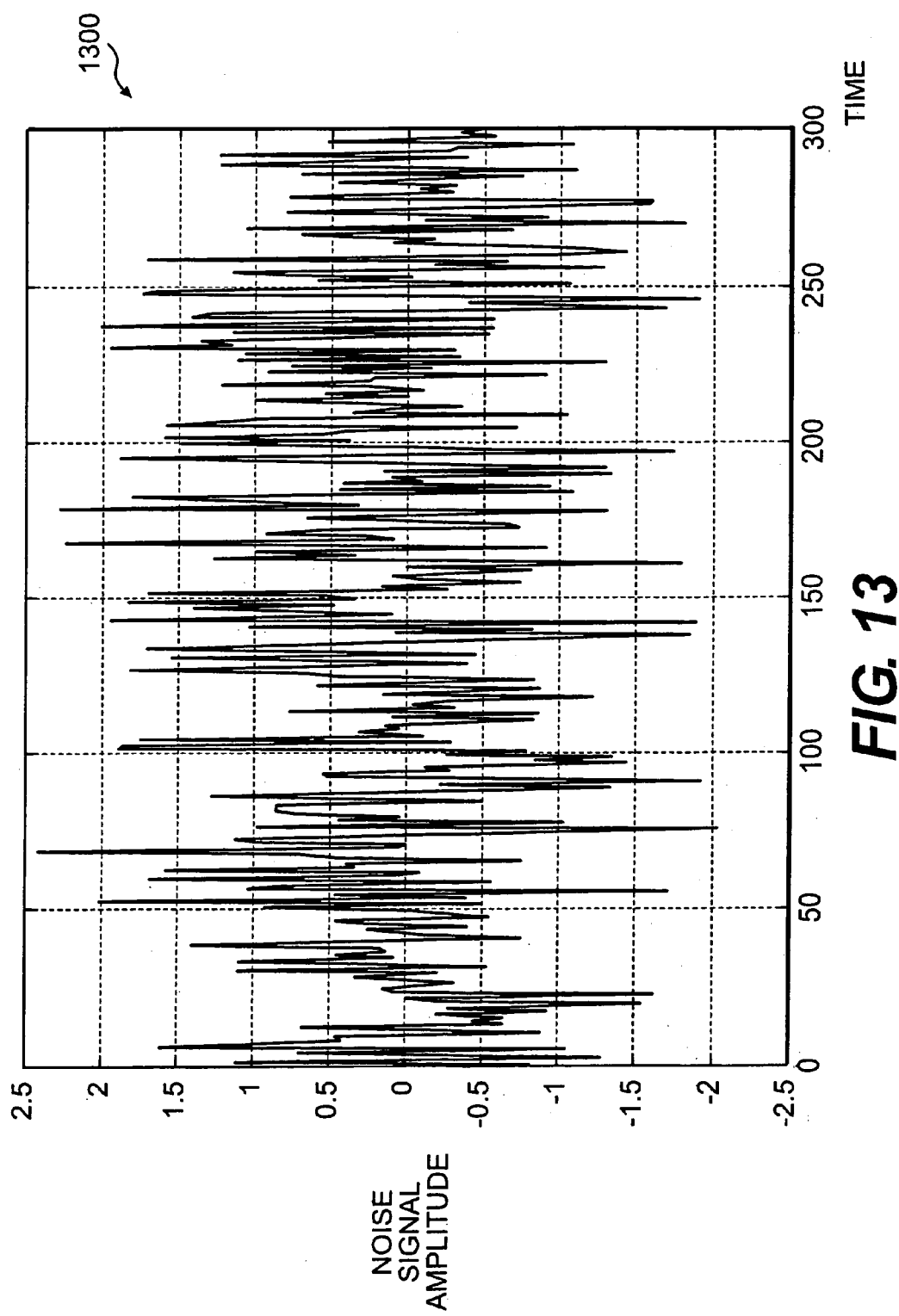
FIG. 13 illustrates an exemplary plot of a white noise signal.
Figure 14:
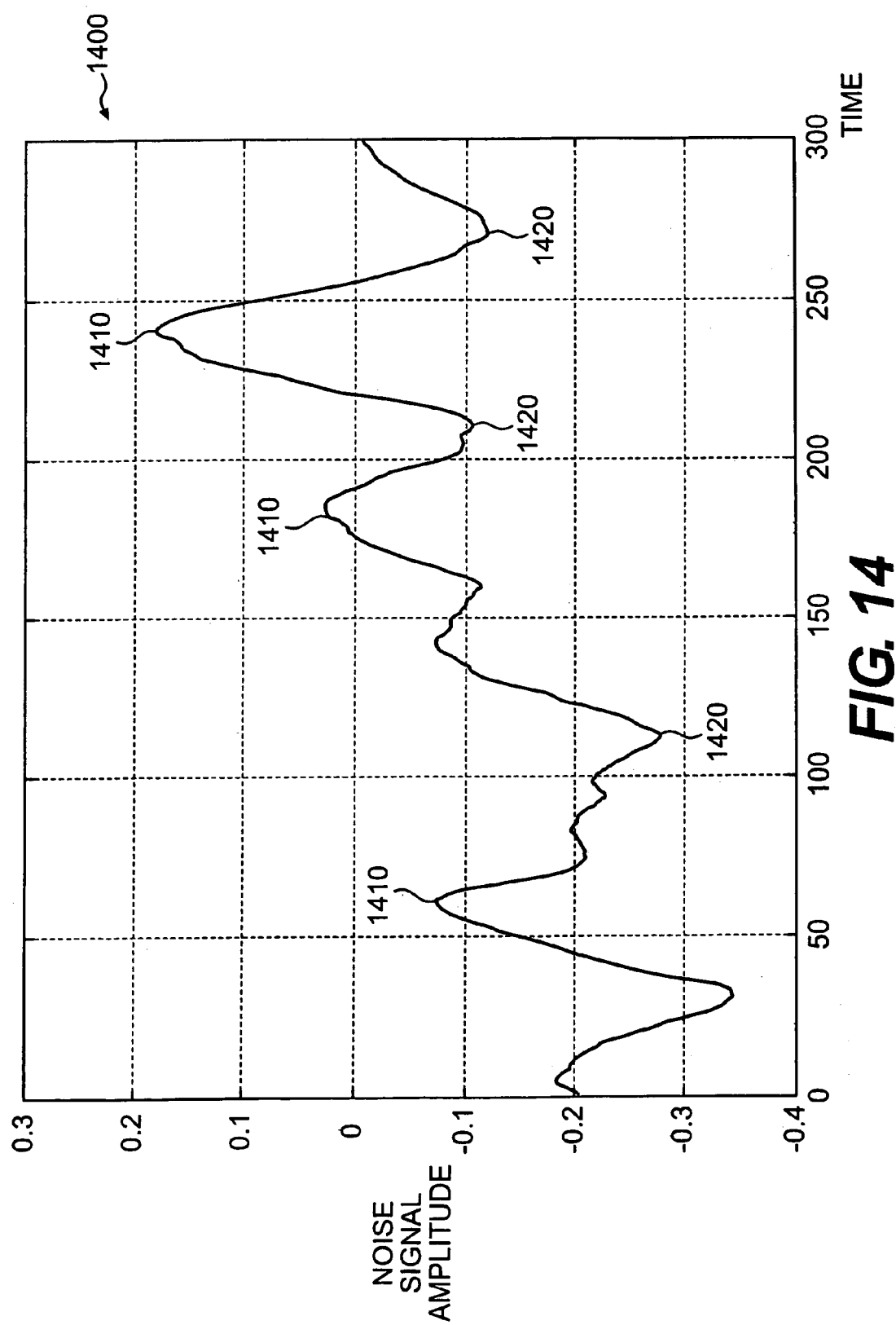
FIG. 14 illustrates an exemplary plot of noise signal having filtered or deemphasized high frequency components.

In more detail, white noise has a spectrum in which each frequency component has the same noise distribution. As seen in FIG. 13, the value (y axis) at each time (x axis in FIG. 13) of noise signal 1300 can have a value that varies independently of values at other times. As seen in FIG. 14, however, if higher frequency components are filtered out, for example through blurring, a "pink" noise signal 1400, as shown in FIG. 14, can be obtained (FIG. 14 is shown for illustrative purposes and does not represent a particular filtering of the spectrum shown in FIG. 13). Spectrum 1400 possesses a degree of continuity from one time to the next, and therefore exhibits more gradual peaks 1410 and valleys 1420, then the noise signal shown in FIG. 13.

Information (e.g., markings) having spatial spectral components filtered out by the channel many not be accurately sensed or detected, thereby decreasing the capacity of a channel encoded with high-frequency components. Information may be encoded more efficiently, however, if the spectrum associated with the information more closely matches the filtered spectrum. In the present example, the spectrum associated with barcode 12 is shaped to correspond to the blurred surface noise spectrum of rod 10, to thereby increase information capacity of the barcode.

Figure 17:
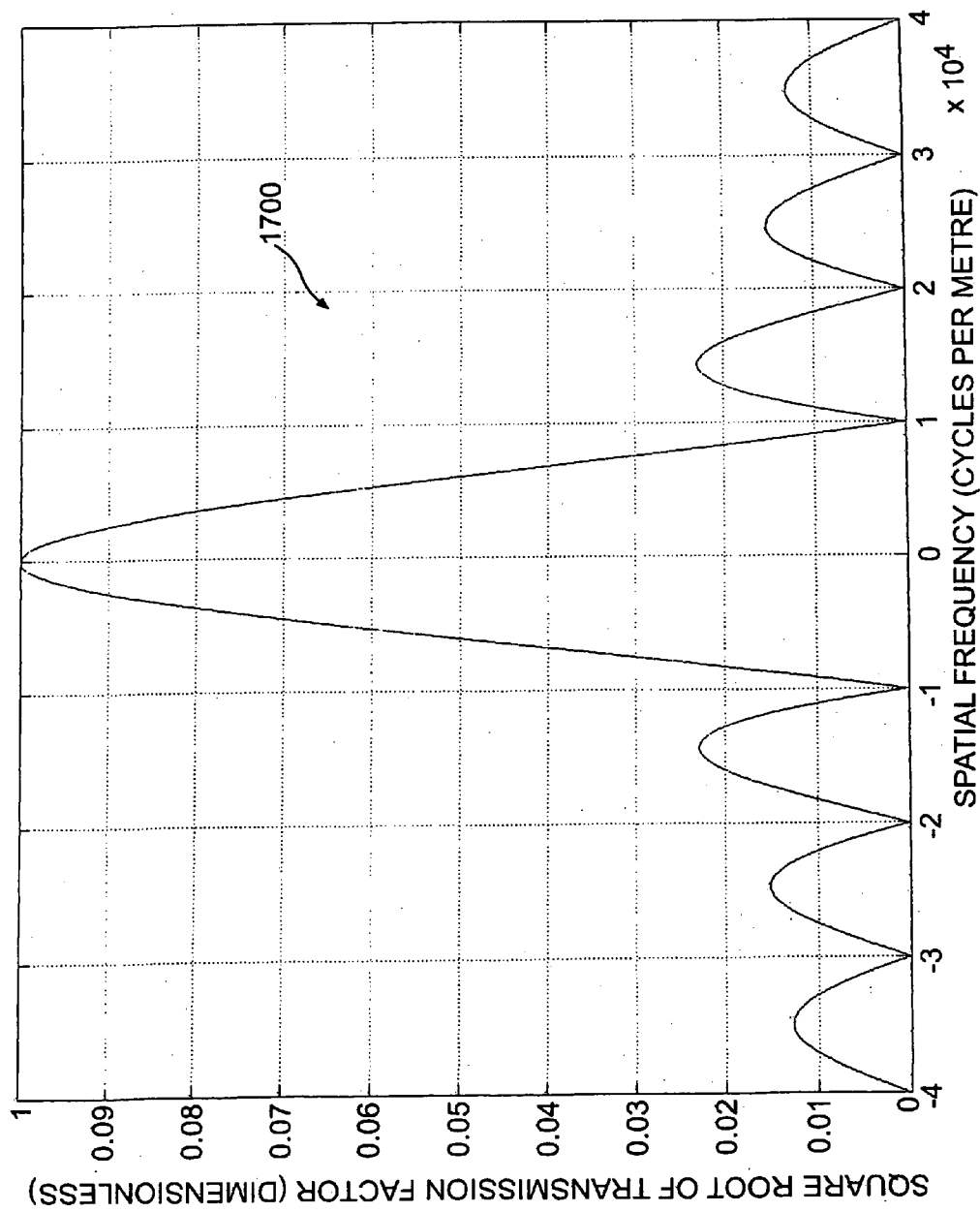
FIG. 17 illustrates an exemplary spatial frequency spectrum, which may be associated with optical components, such as lens 910 shown in FIG. 9.
Figure 18:
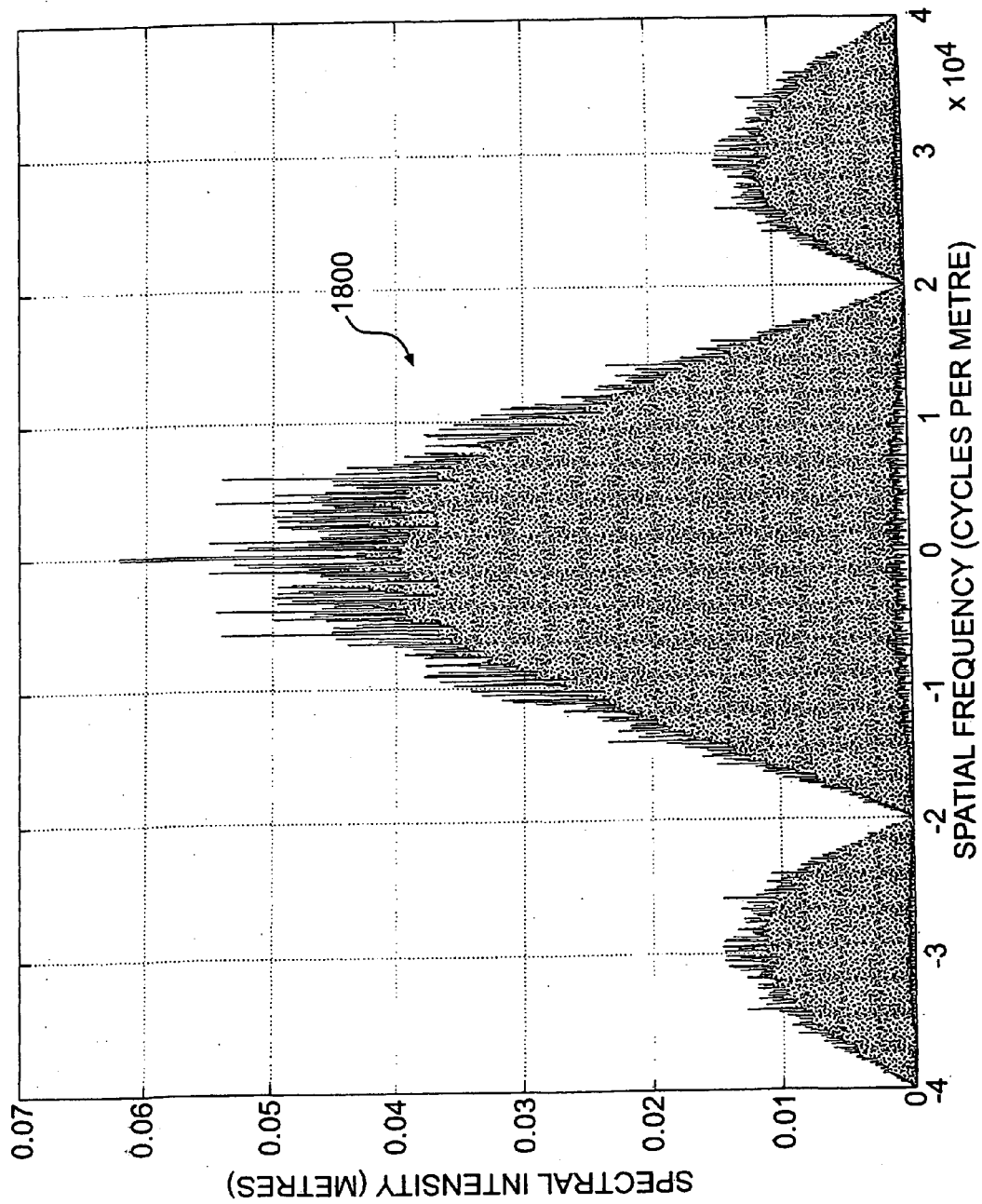
FIG. 18 illustrates an exemplary spatial frequency spectrum of a barcode in accordance with an aspect of the present disclosure.
Figure 19:
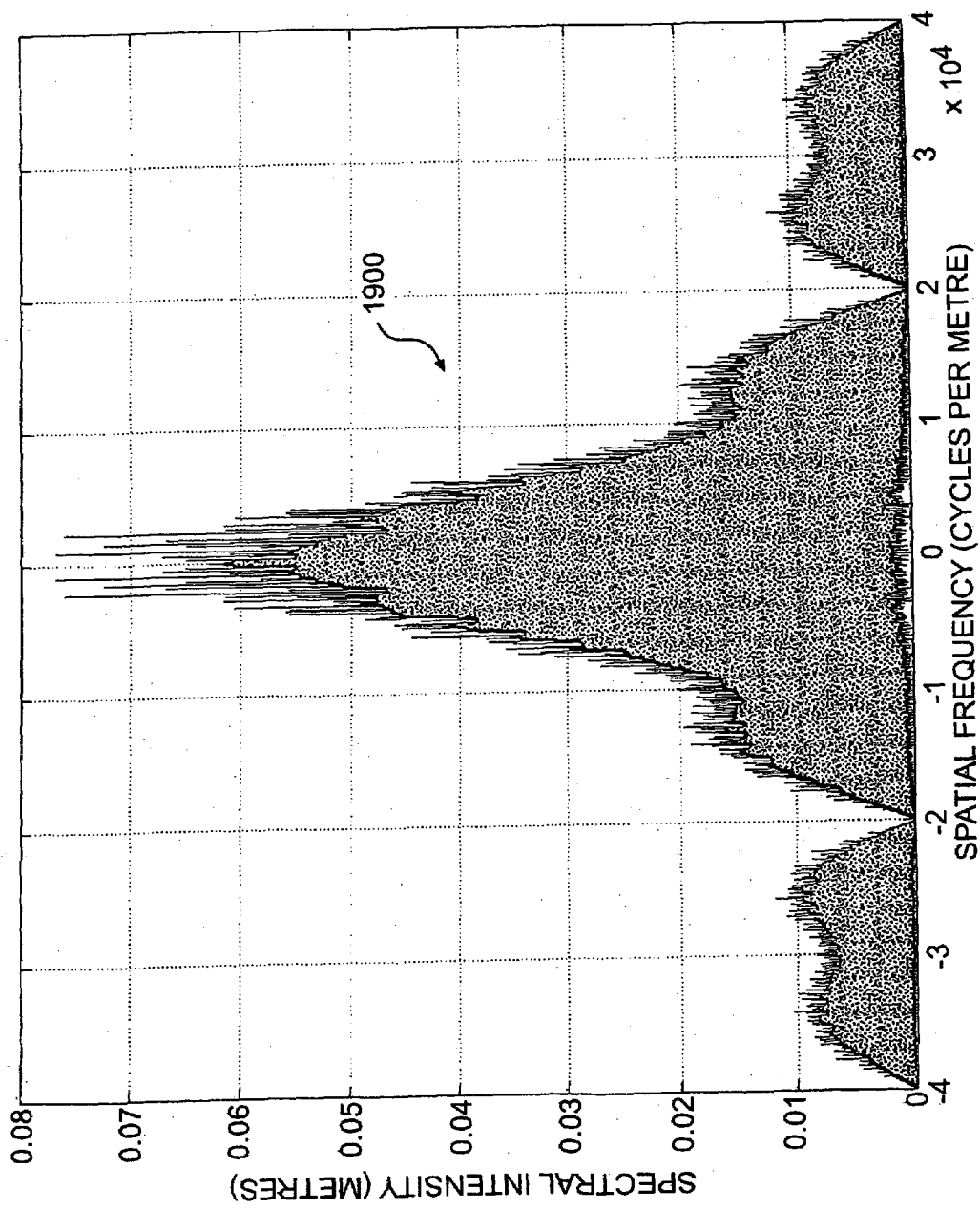
FIG. 19 illustrates an exemplary spatial frequency spectrum of a barcode in accordance with a further aspect of the present disclosure.

In particular, an exemplary spectrum 1700 which may be associated with lens 910 is shown in FIG. 17. Spectrum 1700 is shown for illustrative purposes, and typically depends upon the structure and composition of lens 910. As noted above, the shape of spectrum 1700 is attributable to blurring caused by lens 910. Spectrum 1800 shown in FIG. 18 represents a spatial frequency spectrum associated with a barcode consistent with an aspect of the present disclosure, but does not fully match the spectrum 1700, and may result in less efficient reading of the barcode. FIG. 19, however, illustrates an alternative barcode spectrum consistent with a further aspect of the present disclosure, whereby high or first frequency components (e.g., frequency components at $1 \times 10^4$ cycles per meter) have been filtered or deemphasized relative to lower or second frequency components (e.g., frequency components less than $5 \times 10^3$ cycles per meter) to more closely match or substantially conform to the shape of spectrum 1700. As a result, more efficient sensing of barcode information can be achieved.

In order to provide a barcode having an associated spectrum that is appropriately shaped, and consistent with a feature of the present disclosure, a random number generator calculates series' of pseudo-random numbers, each term of each series corresponding to a short contiguous region of surface 11 of rod 10. Each series is preferably weighted by a given factor, which can be determined empirically. Thus, one series of numbers corresponding to relatively large and widely spaced regions on the surface may be weighted more heavily than another series of number corresponding to smaller and more closely spaced regions. Thus, when the series' are summed to obtain the barcode (whereby, for example, a positive sum value designates a light region on surface 11, while a negative sum designates a dark region) certain spatial frequency components may be emphasized while others are deemphasized to obtain a spectrum having a preferred shape.

If different optics are used, the above-described blurring, and thus spectrum-shape, may change. Thus, optimal performance may be obtained if weighting factors, the number of series summed, and the surface spacing associated with each term of each series, are tailored for given lenses and optics in the optical reader.

Figure 4A:
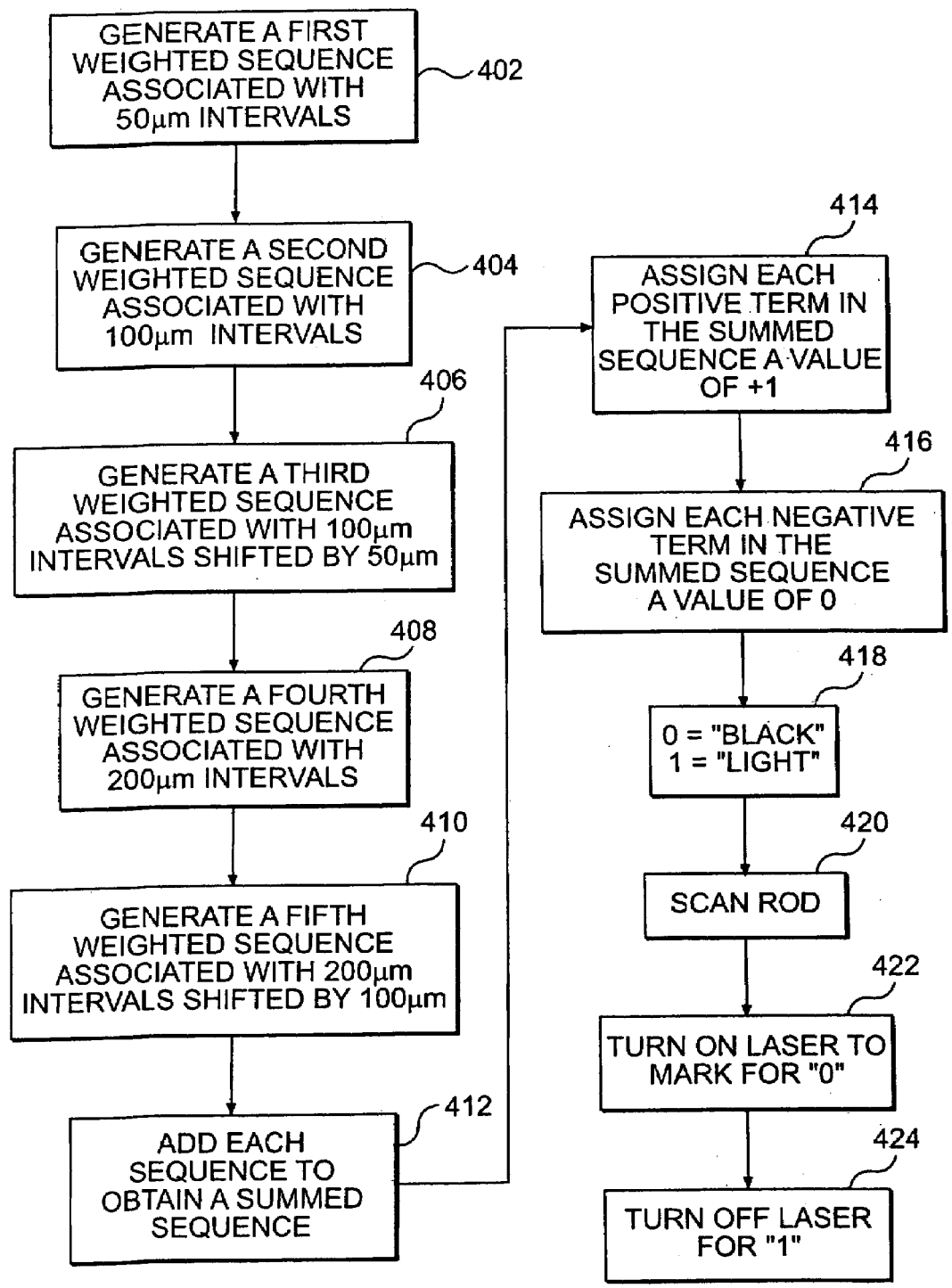
FIG. 4A illustrates a flow chart of a method for generating a barcode in accordance with a further aspect of the present disclosure.

An exemplary method for generating barcode 12 will next be described in connection with FIGS. 4A–4F. FIG. 4A is a flowchart illustrating steps which can be performed to generate a barcode consistent with an aspect of the disclosure, and FIGS. 4B–4F illustrate regions on rod surface 11 discussed in connection with FIG. 4A.

As noted above, the barcode constitutes a series of bands of various widths on surface 11, typically marked with a laser. The bands are created by first generating a first weighted sequence of numbers (step 402). The numbers are preferably calculated with a Gaussian random number generator (although other random number generators may be used) and each is multiplied by a weight factor (1 in this example). Each term or number of the series of random numbers is associated with first regions 430 of surface 11 of rod 10 (see regions in FIG. 4B). In this example, each region has a first width of 50 microns, for example. In step 404, a second weighted sequence is obtained by multiplying a series of numbers calculated with a Gaussian random number generator, and multiplying the series with a second weight factor, e.g., $8\sqrt{2}$. Each weighted number is associated with second regions 432 in surface 11, as shown in FIG. 4C. In the present example, each second region 432 has a second width of 100 microns, for example, and overlaps each of first regions 430.

Third, fourth and fifth weighted number sequences can also be generated in a similar fashion in steps 406, 408 and 410, respectively. Namely, each number of the sequence is a product of a weight factor and a Gaussian random number generated term. The third, fourth and fifth weight factors are $$8\sqrt{2}, \frac{1}{\sqrt{2}}, \frac{1}{\sqrt{2}},$$

respectively in this example. Each term of the third sequence, however, is associated with 100 micron regions or intervals 434 shifted by 50 microns relative to the second regions (see FIG. 4D). In addition, each term of the fourth sequence is associated with regions 436 on surface 11 having a width of 200 microns (FIG. 4E), and each number of the fifth sequence is associated with 200 micron wide regions 438 shifted 100 microns relative to fourth regions 436.

In step 412, the first through fifth sequences are added to one another to obtain a summed sequence, each term of which typically has either a positive or negative value and is associated with a particular 50 micron wide region, for example, of surface 11. The positive terms are assigned a value of +1 (step 414), and the negative terms are assigned a value of 0 (416). In step 418, the series of 1s and 0s associated with the summed sequence is used to drive a conventional laser for selectively marking (in steps 420 and 422) the 50 micron wide regions of outer surface 11 of rod 10 to thereby generate coded information. In accordance with such coded information, markings may be marked, preferably with a laser, on surface 11, by scanning or moving rod 10 (step 420) past a laser which is selectively turned on in response to "0"s (step 422) to create "black" 50 micron wide regions in surface 11, and off in response to "1"s to create "light" 50 micron wide regions (step 424) or markings.

Figure 5A:
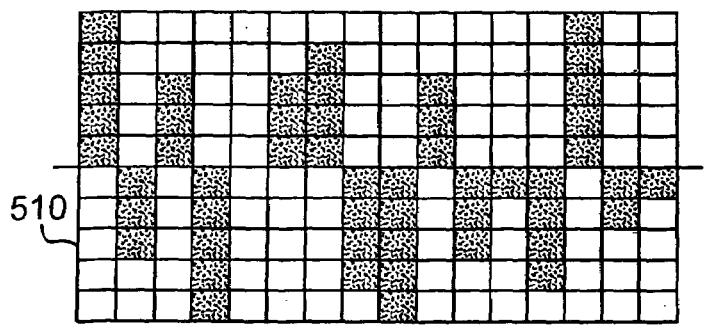
FIGS. 5A–5E illustrate results of intermediate steps of an alternative method for generating a barcode in accordance with a further aspect of the disclosure.
Figure 5B:
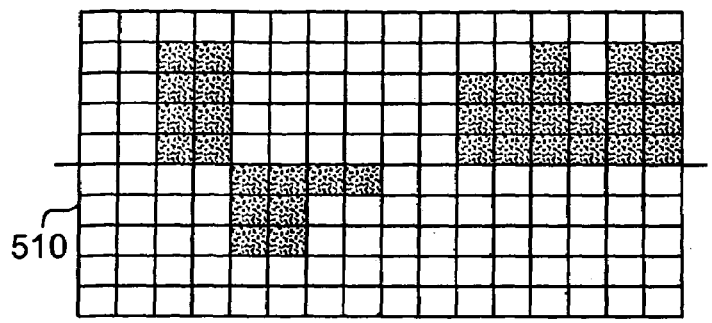

FIGS. 5A to 5E illustrate an alternative method for generating a barcode in accordance with a further aspect of the present disclosure. The method shown in FIGS. 5A–5E is similar to that discussed above in regard to FIGS. 4A to 4F, except the terms of each randomly generated number series are not multiplied by a weighting factor. In addition, only three series are added, instead of five as discussed above. In addition, in FIG. 5A each term of a first series is calculated by a Gaussian random number generator and assigned a corresponding 50 micron wide region of surface 11. Each square 510 in FIG. 5A (as well as FIGS. 5B, 5C and 6A–6C) in a horizontal direction corresponds to a 50 micron region on rod surface 11. In a vertical direction, the magnitude of each number or term is represented by a corresponding number of shaded squares. In FIG. 5B, a second series of randomly generated numbers (calculated with a Gaussian random number generator) are assigned corresponding 100 micron wide regions in surface 11, the magnitude of each number of the second series being represented by a corresponding number of shaded squares in the vertical direction. In addition, in FIG. 5C, each term of a third sequence of numbers, generated with a Gaussian random number generator is associated with corresponding 200 micron wide regions on surface 11. The sequences are then added, the sum of which is depicted by the bar chart 520 in FIG. 5D. Positive terms of the summed series are then assigned a +1 value or "light", and negative terms are assigned a 0 value or "black". The resulting series of 1s and 0s is used to turn a laser on and off to selectively mark surface 11 over 50 micron regions corresponding to each term of the binary sequence. Accordingly, a portion of barcode 530 shown in 5E is marked on surface 11 of rod 10.

Figure 5C:
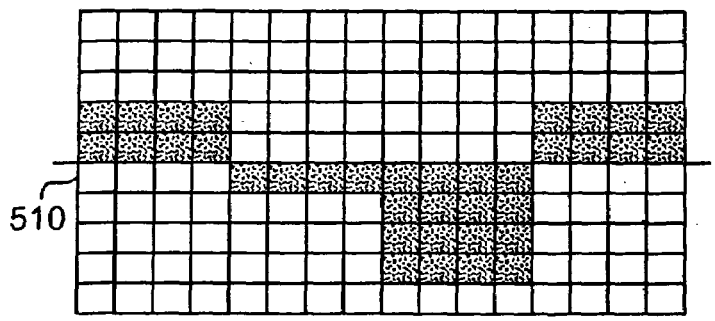
Figure 5D:
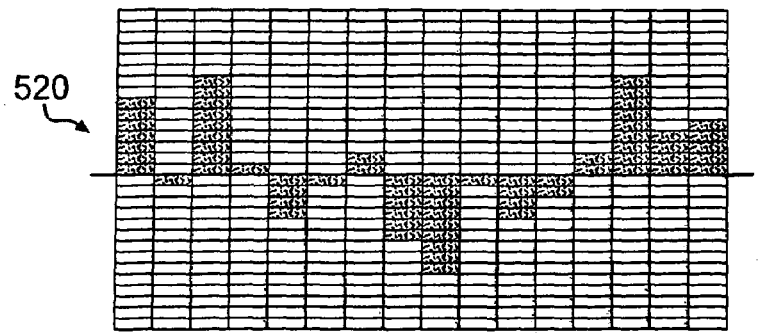
Figure 5E:
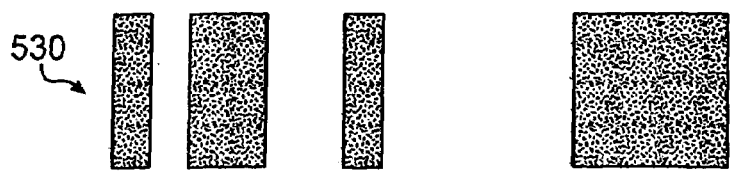
Figure 6A:
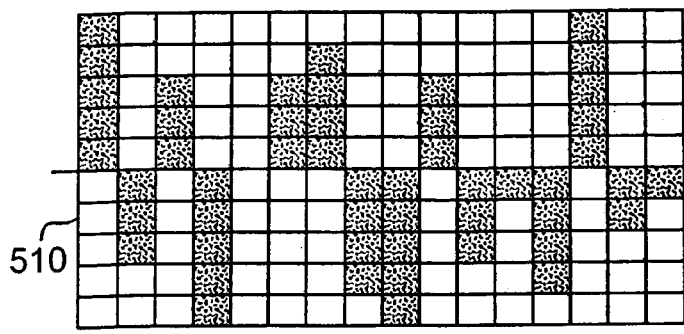
FIGS. 6A–6E illustrate results of intermediate steps of an additional method for generating a barcode consistent with an aspect of the disclosure.
Figure 6B:
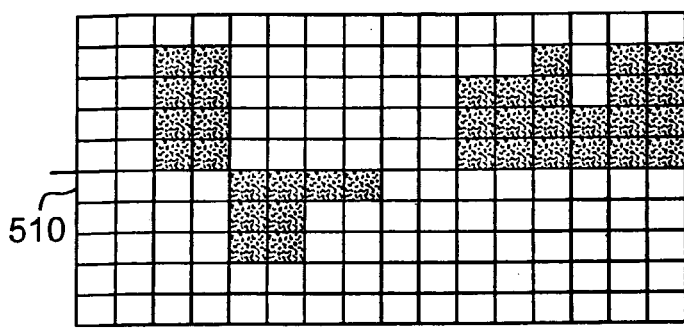
Figure 6C:
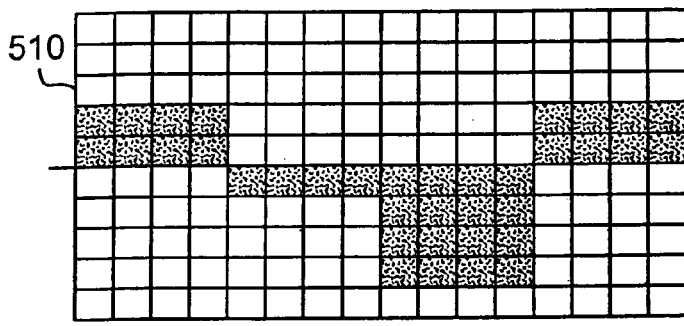
Figure 6D:
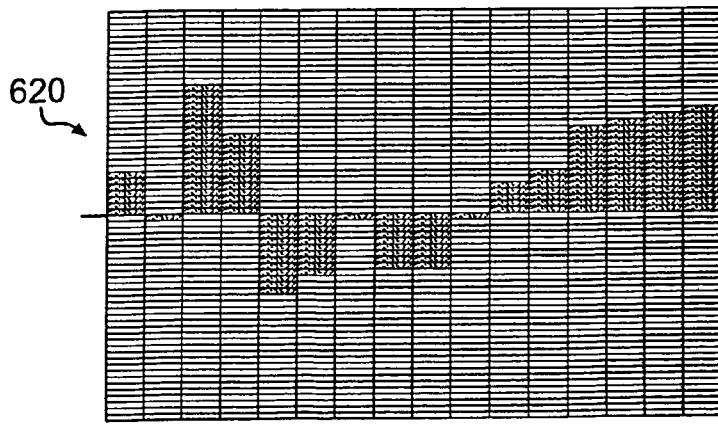
Figure 6E:

FIGS. 6A to 6C illustrate the first through third series of randomly generated numbers shown in FIGS. 5A to 5C, but multiplied by first, second and third weighting factors, respectively. In this example, the first, second and third weighting factors equal 1, 4 and 1, respectively. The first through third weighted series are added in FIG. 6D to obtain bar chart 620, and the resulting barcode 630 is shown in FIG. 6E based on assignment of 1s and 0s in a manner similar to that described above.

As noted above, markings 350 are divided into subsets, and each corresponds to a different position of rod 10. To ascertain a position of rod 10, a portion of surface 11 is exposed to light and a sense signal is generated in response to light reflected off that portion of surface 11 A likely subset of markings corresponding to the sense signal is then identified and associated with a location of rod 10.

In determining the likely subset of markings corresponding to the rod location, it is noted that the sense signal often does not precisely correspond to the markings in the exposed portion of surface 11. Several sources of noise distort the light supplied to the barcode, as well as light reflected from the bar code, thereby affecting the sensed signal output from photosensors in sensor 16. In addition, electronic noise, noted above, originating in circuitry associated with the photosensors can further distort the sense signal. A more detailed discussion of noise sources will next be presented.

Scale or markings 12 on surface 11 ideally constitute a square wave, but in practice are observed as a spatially filtered square wave due to the blurring distortion caused by the optics 910 and rod movement, as discussed above. However, the signal thus obtained is neither the original ideal square wave nor the blurred and filtered form of it. Rather, the sense signal is corrupted by electronic noise and surface noise.

Electronic noise is associated with the photosensors in sensor 16 and associated circuitry. Various forms of electronic noise are known, including, among other sources of electronic noise, photon or shot noise, Johnson noise, and kT/C noise (the equivalent of Johnson noise for discharging capacitors). The noise sources are associated with the electronics, which is necessarily independent of any noise source associated with the light itself that is received by sensor 16. Accordingly, if rod 10 remains stationary and a sequence of images (i.e., images of a group of markings 12 on surface 11) are collected by sensor 16, the electronic noise associated with each image is essentially independent from image to image—and in particular different from image to image.

Noise associated with surface 11 or surface noise, however, is attributable to many small or microscopic imperfections on surface 11 of rod 10. Rod 10 is typically made of metal, often chrome or metal, and surface 11 may include a known thermally sprayed coating. Surface 11, includes a large number of tiny facets, which generate variations in the amount of illumination light reflected into the sensor circuit 16. If rod 10 does not move and a sequence of images are collected, each image will be of the same portion of surface 11, and thus the same imperfections will create the same amount of surface noise in each image. Accordingly, if multiple images are acquired, averaging such images may reduce electronic noise, but not surface noise, nor the desired signal, i.e., the reflected light representing the illuminated group of markings 12. Relatively tall and thin pixels can be used to average surface noise. Alternatively, θ (the angle over which the barcode extends on surface 11, so as to average the surface noise over a range of the rod's circumference) can be changed. Both approaches, however, may be difficult to implement.

Experimentally, electronic noise has been found to be 20 dB smaller than the signal—but the surface noise may be larger than even the sense signal in some circumstances. Accordingly, surface noise dominates SNR substantially more than electrical noise. A number of factors can influence the magnitude of the surface noise including surface finish, or how smooth and shiny surface 11 is. However, the precise geometry of the illumination and observation optics 910, 912 and 914 is also important, as the ratio of sensed signal to noise can be reduced if, for example, lenses 912 and 914 are spaced a substantial distance away from surface 11 e.g., 8 mm as opposed to 1 mm.

Other sources of noise are also present. Namely, lens 910 contains imperfections and thus causes some degree of blurring. Such blurring combined with the blurring caused by the motion of rod 10 acts as a spatial filter that modifies both received optical signals and surface noise. Since photosensor array 908 has sharp cutoffs at both ends, blurring can be represented mathematically by a linear filter matrix A, and each photosensor input can be treated as a component of a vector of optical signal values. Matrix A is not square, and therefore is also not invertible and will be discussed in greater detail below.

Figure 7:
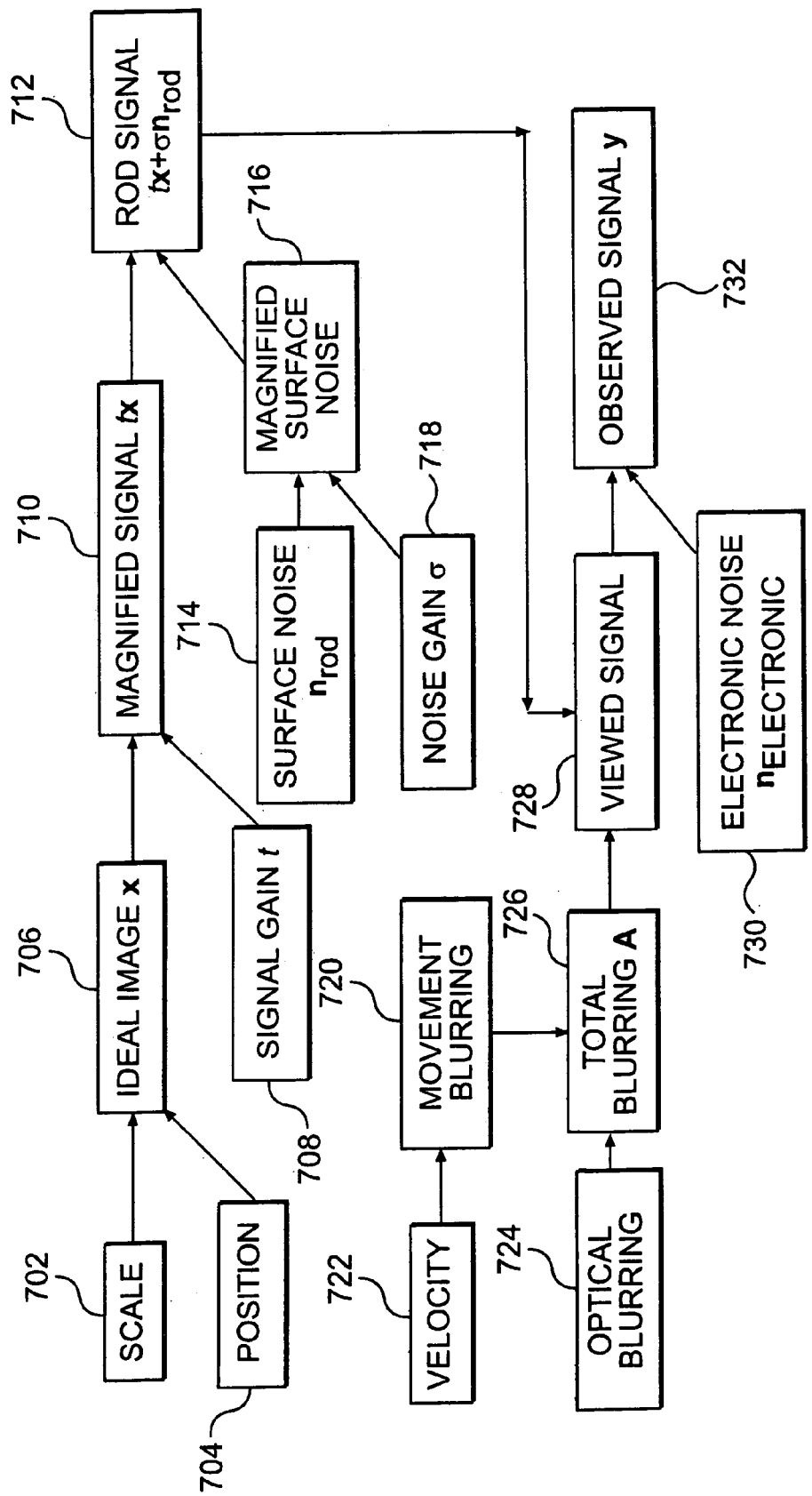
FIG. 7 is a block diagram illustrating interaction of various noise parameters affecting the quality of signals in the system shown in FIG. 1.

FIG. 7 illustrates how various signals and noise sources present in system 100 interact with one another. As noted above, the barcode or scale includes a plurality of markings 12, each subset of which corresponds to a unique position. Thus, the ideal image x 706 is based on the particular position 704 of rod 10 defining one subset of markings of the overall scale 702. In the present example, x is a vector of approximately one hundred sixty 50 micron wide pixels on the surface 11 of rod 10 in front of sensor 16. The ideal image is subject to gain stemming from the laser marking process, as well as from illumination from emitters 14. Collectively, these two gains can be represented by a single gain parameter t that magnifies the optical signal (see boxes 708 and 710). Surface noise $n_{rod}$ is the vector of surface noise values (see box 714), which is assumed to have a Gaussian distribution with zero mean and covariance matrix V before the application of noise gain σ (box 718) through illumination (box 716). Amplified surface noise and signal contribute to the rod signal image $tx+\sigma n_{rod}$ where σ is the gain applied to the surface noise; let $s=1/\sigma^2$ in the formulas presented below.

As noted below, movement of rod 10 or velocity (box 722) can introduce blurring (box 720), which in combination with blurring associated with the optics (box 724), yields a total blurring represented by matrix A (box 726). A is the matrix that represents the total blurring (which will be different at different rod velocities); thus in the absence of noise yields y=Atx. In addition, observed signal y is a vector of signal pixel values (here, 86 μm pixels wide), typically having a vector length (i.e. dimensionality) which is different from that of x.

Blurring distortion influences the optical signal reflected off markings 12 to produce a viewed signal (box 728), which is converted to an electrical sense or observed signal y (box 732), which is influenced by electronic noise $n_{electronic}$ (assumed to be Gaussian distributed with zero mean and associated covariance matrix U). As further discussed above, electronic noise influences the observed signal y (box 730).

Thus, based on sensor circuit 16 output or sensed signal y, a corresponding value of x is determined. As noted above, however, due to various noise sources, signal y may not correspond precisely to x, but is some corrupted version of it. As discussed in greater detail below, a probabilistic approach based on Bayesian inference was adopted to determine a likely x corresponding to the sensed signal y (in a manner related to that which a probability is calculated that a number shown by a tossed dice, is divisible by 2, given that the number is also divisible by 3). In mathematical terms, the Bayesian inference is implemented to define a posterior distribution of x given y, which is substantially equivalent to the expression P(w|z) (as discussed in greater detail below w relates to x, and y relates to z). Since each x corresponds to a particular rod location, the rod location can be found once x is identified.

Accordingly, the present disclosure overcomes conventional barcode position techniques, whereby a precise match between a sense signal and a barcode segment is required to determine a rod position. In such techniques, various sources of noise (e.g., blurring due to rod movement, hydraulic fluid, rod imperfections, etc.) distort the sense signal rendering a match difficult. As disclosed herein, probability, preferably Bayesian probability, is used to determine a likely rod location corresponding to a sensed signal. As a result, the barcode achieved herein is substantially more robust than conventional barcodes.

Figure 8:
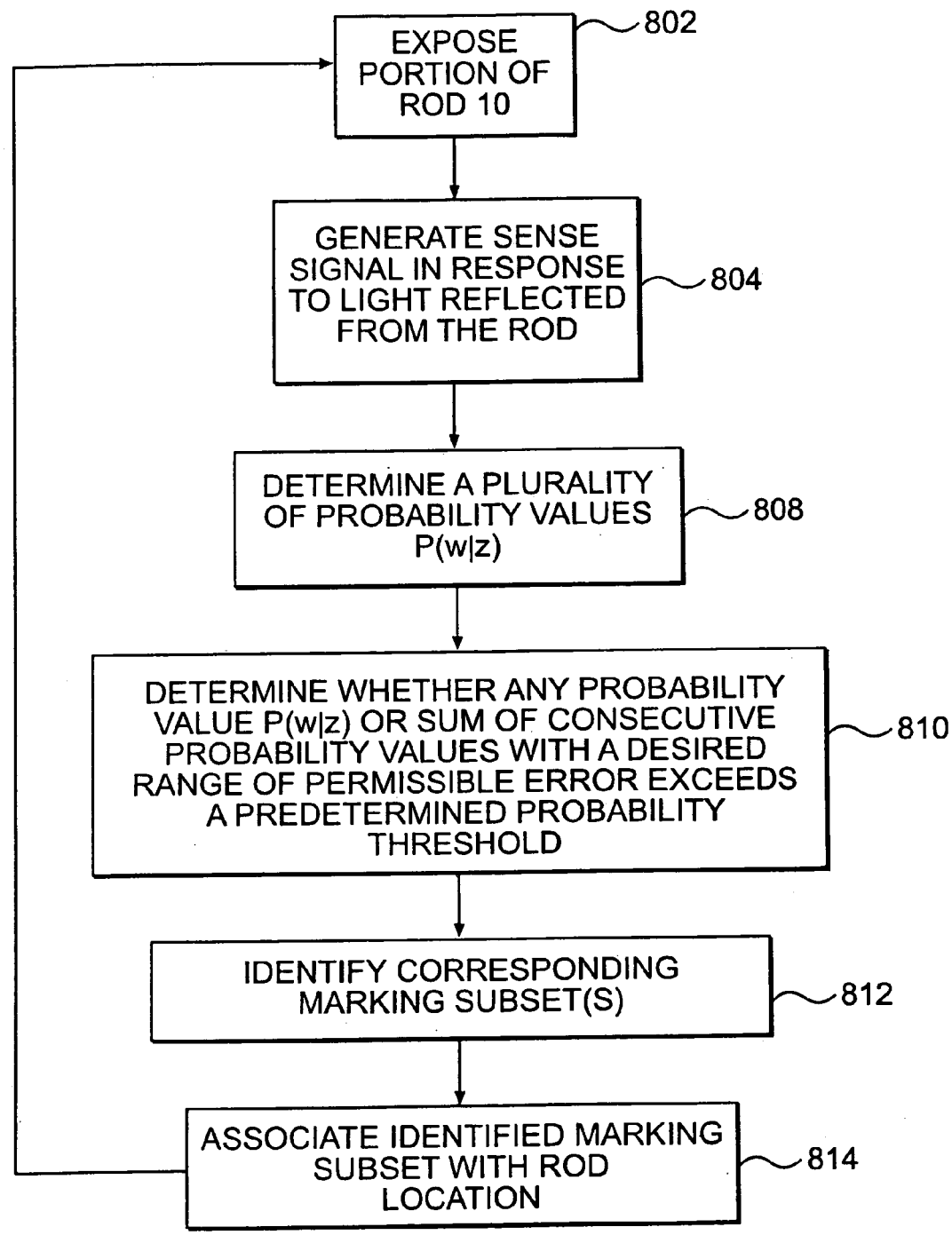
FIG. 8 illustrates a method of determining rod location in accordance with a further aspect of the disclosure.

Functionally, the following steps described below and shown in FIG. 8 are carried out to determine rod location based on a sensed signal y. The method consistent with the present disclosure will also be described with reference to FIG. 15. In a first step 802, a portion of rod 10 is exposed to light and a sense signal y is generated in response thereto (step 804). A plurality of probability values P(w|z) or posterior distribution of w given z is calculated (step 808) by processor 18. As discussed in greater detail below, based on at least some of these probability values, a subset of markings 12 is identified and associated with a corresponding rod location.

As used herein, the term "probability values" includes multiples of probability values that may or may not exceed 1, as well as values which are substantially equal to such multiples.

Figure 15:
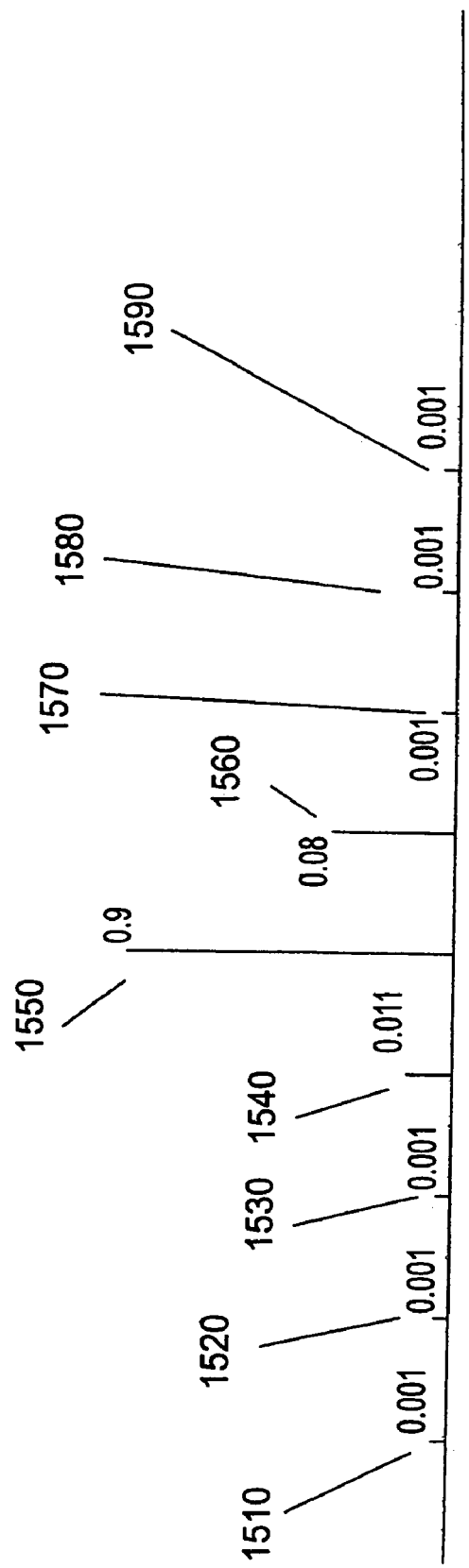
FIG. 15 illustrates a plot of exemplary probability values.

Graphically, exemplary probability values are shown in FIG. 15 in which a plurality of probability values 1510, 1520, 1530, 1540, 1550, 1560, 1570 and 1580 correspond to particular subsets of markings 12. The magnitude of each probability value is also shown in FIG. 15, e.g., probability value 1510 has a value of 0.001, while that of probability value 1560 is 0.08 (note that to simplify FIG. 15, the height of each line shown in the drawing is not drawn to scale, but generally reflects the relative magnitude of each value). In step 810, a determination is made as to whether any probability value P(w|z) or sum of any contiguous or consecutive set of probability values associated with locations spaced over a suitably small physical distance (or over a range of permissible error) exceeds a predetermined probability threshold. The determination can be made by comparing the sum or probability value with the predetermined probability threshold. In the example shown in FIG. 15, the predetermined probability threshold is 0.99 and the range of permissible error is assumed to ±50 microns equal to the rod pixel width. The rod pixel width is the highest common factor of the set of distances between each bar edge and the first bar edge on the scale (alternatively, the rod pixel width may be taken to be a sub-multiple of the highest common factor, if finer resolution is required; in the preferred embodiment of the present disclosure resolution of 1–2 microns can be achieved).

Processor 18, in this instance, will sum triplets (each of which being a subset of the plurality of probability values) of consecutive probability values until a sum is obtained that exceeds the predetermined probability threshold. For example, the sum of values 1510, 1520 and 1530 may first be determined to be 0.003, well below the predetermined threshold value of 0.99. An adjacent triplet of values, 1520, 1530 and 1540 may then be added to obtain a sum of 0.013, also below the predetermined threshold. The probability values will continue to be added in threes until a sum is obtained that exceeds the predetermined threshold value. Here, the sum of the set of values 1540, 1550 and 1560 is 0.991, which exceeds the predetermined threshold value of 0.99. No other triplet of values yields this result. Accordingly, middle value 1550 within the set will be identified, as well as the location of the rod associated with the marking subset corresponding to value 1550 Also, the rod location within the set will be reported by processor 18 to be within a range of permissible error of ±50 microns.

In the example discussed herein, the desired range of permissible error was set to be ±50 microns. However, any suitable range of permissible error can be selected, but with a corresponding change in the number of consecutive probability values to be summed. For example, if the range of permissible error was instead set to ±100 microns, then consecutive probability values would be added in groups of five until a sum is obtained that exceeds the predetermined threshold. The reported probability value is the one located in the middle of the set of five values that yield the qualifying sum, which, in the example shown in FIG. 15, is value 1550.

Returning to FIG. 8, in step 812, marking subsets corresponding to values 1540, 1550, and 1560 (again assuming a range of permissible error of ±50 microns) are identified (step 812), and the identified marking subsets are associated with rod locations (step 814) by processor 18, typically with a look up table 19 (see FIG. 1). Thus the rod location will be identified as the location that is in the middle of the triplet set, or the marking subset corresponding to probability value 1550. Although a single probability value may be found that exceeds the predetermined probability threshold in step 810, processor 18 typically sums triplets of consecutive probability values, as discussed above, and reports the middle value of the triplet. Thus, there may be an instance in which the following consecutive probability values are obtained, in order, 0.8, 0.01 and 0.1, the sum of which being 0.991. Assuming the above probability threshold of 0.99, the middle value of the triplet, namely 0.01 will be reported, even though its value is less than the other two. Once the middle probability value of the triplet is obtained, the marking subset associated with that probability value is identified, as well as a corresponding rod location. The rod is exposed again (step 802) and remaining steps 804, 808, 810, 812 and 814 are repeated to ascertain a new rod location.

If no sum of adjacent probability values exceeds the predetermined threshold, a "bad" result is obtained and no rod locations are reported. The rod is then exposed again (step 802). Alternatively, in the event that a sum of more than two probability values exceeds the predetermined probability threshold, a wider range of probable rod locations may be reported. For example, as noted above, if the sum of five adjacent probability values exceeds the predetermined probability threshold, processor 18 may report a rod location within a 200 microns range (±100 microns) of possible rod locations.

Mathematical derivation of the distribution P(w|z) based on a Bayesian inference will next be described. In order to apply Bayesian inference, assumptions for gain variable s and t should be made (i.e., the "priors" on s and t should be set). Simply assuming fixed values of s and t may not yield an accurate distribution P(w|z), as the actual values of s and t can vary from rod to rod and are subject to various noise influences, as noted above.

s is related to surface noise σ ($s=1/\sigma^2$) and represents a quantity that is necessarily positive and whose value is unknown, and preferably large (i.e. σ is preferably small). The value of s can potentially vary over several orders of magnitude, and there is no particular reason to favor one decade over another, and log s is assumed to be uniformly distributed over some suitably large range centered on zero (here "suitably large" means so large that making it larger won't make any practical difference to the results). If logs is uniformly distributed over a large range, then so is log σ (albeit over a different large range). Optical signal gain t, however, behaves differently than s. Preferably t should be as large as possible so that the received optical signal has a large magnitude. Accordingly, t is not expected to be near zero. On the other hand, the optical signal could have a relatively small magnitude under some circumstances. Accordingly, the "prior" on t is set to be uniform over some suitably large range starting at zero (i.e. excluding negative values). Keeping t uniform is a good approximation and simplifies the derivation of P(w|z). In addition, to further simplify the derivation, the surface noise gain σ is applied to the electronic noise as well, rather than using two separate gain variables, one for each noise source. This is a reasonable approximation so long as values of V and U are chosen such that, as σ varies, the proportion of electronic noise remains relatively small compared with the surface noise.

Given the above, P(w|z) can be derived in accordance with Bayesian inference. As seen in FIG. 7, and discussed above, y can be expressed as follows:

$$y = A(tx + \sigma n_{rod}) + \sigma n_{electronic}$$

The covariance matrix of $A\sigma n_{rod} + \sigma n_{electronic}$ is (AVA'+U)/s (since surface and electronic noise are independent), which is positive definite and symmetric since both U and V have these features (the superscript dash means transpose). Accordingly, AVA'+U has an inverse which has a positive definite and symmetric square root, so matrix B can be defined as:

$$B = (AVA' + U)^{-\frac{1}{2}}$$

Let z=By and w=BAx. Since B is invertible and known, knowing z carries exactly the same amount of information about x as knowing y does. Bayesian inference can thus be applied to z, on the basis of a list of values of w, and the results be expected to be exactly the same as if the inference had been applied to x.

Accordingly, $$z = By$$

$$= B(A(tx + \sigma n_{rod}) + \sigma n_{electronic})$$

$$= tw + \sigma n$$

where $n = B(An_{rod} + n_{electronic})$. But by virtue of the construction of B, n has covariance matrix equal to the identity (since surface and electronic noise are independent). Thus, $$P(z \mid w, t, s) = s^{N/2}(2\pi)^{-N/2} e^{-\frac{1}{2}(z-tw)'s(z-tw)}$$

where N is the dimensionality of z, i.e. the number of photodiodes or pixels in sensor circuit 16. P(t) is constant and P(s) is proportional to 1/s. Therefore, applying the following known laws of probability:

$$P(w \mid z) = \int_0^\infty \int_0^\infty P(w, t, s \mid z) \, ds \, dt \text{ (marginalisation rule)}$$

$$= \int_0^\infty \int_0^\infty \frac{P(w, t, s) P(z \mid w, t, s)}{P(z)} \, ds \, dt \text{ (Bayes' theorem)}$$

$$= \int_0^\infty \int_0^\infty \frac{P(w) P(t \mid w) P(s \mid t, w) P(z \mid w, t, s)}{P(z)} \, ds \, dt$$

(Chain rule)

$$= \int_0^\infty \int_0^\infty \frac{P(w) P(t) P(s) P(z \mid w, t, s)}{P(z)} \, ds \, dt$$

where the last line follows since knowing the position of the rod makes no difference to the distribution of t, and knowledge of both t and w makes no difference to the distribution of s.

Now, P(z) does not vary with w (although P(z|w) does). Therefore, the above formula may be expressed as a proportionality instead of an equality, and by substitution of the above expression, the following is obtained:

$$P(w \mid z) = \int_0^\infty \int_0^\infty \frac{P(w) P(t) P(s) P(z \mid w, t, s)}{P(z)} \, ds \, dt \propto$$

$$\int_0^\infty \int_0^\infty P(w) P(t) P(s) P(z \mid w, t, s) \, ds \, dt \propto$$

-continued $$P(w)\int_0^\infty \int_0^\infty s^{-1} P(z\mid w,t,s)\,ds\,dt \propto$$

$$P(w)\int_0^\infty \int_0^\infty s^{N/2-1} e^{-\frac{1}{2}(z-tw)'s(z-tw)}\,ds\,dt$$

$$= P(w)\int_0^\infty \frac{\Gamma(N/2)2^{N/2}}{((z-tw)'(z-tw))}\,dt \propto$$

$$P(w)\int_0^\infty \frac{1}{((z-tw)'(z-tw))^{N/2}}\,dt$$

where the proportionality symbol indicates that there is a constant of proportionality that does not vary with w.
Simplifying, $$P(w\mid z) \propto P(w)\int_0^\infty \frac{1}{((z-tw)'(z-tw))^{N/2}}\,dt =$$

$$P(w)\int_0^\infty \frac{1}{(z'z - 2tw'z + t^2 w'w)^{N/2}}\,dt = P(w)\int_0^\infty \frac{1}{(c - 2tb + t^2 a)^{N/2}}\,dt$$

where $a=w'w, b=w'z, c=z'z$, and where a and b depend on w. Now, let $\phi$ be the angle between the vectors w and z, and let r be defined by $$r^2 = \cos^2\phi = \frac{b^2}{ac}$$

so that $0 \leq r^2 \leq 1$. Substituting $$q = t - \frac{b}{a}$$

in the integral yields:

$$P(w\mid z) \propto P(w)\int_0^\infty \frac{1}{(c - 2tb + t^2 a)^{N/2}}\,dt =$$

$$P(w)a^{-N/2}\int_n^\infty \frac{1}{\left(t^2 - 2t\frac{b}{a} + \frac{c}{a}\right)^{N/2}}\,dt =$$

$$P(w)a^{-N/2}\int_0^\infty \frac{1}{\left(\left(t-\frac{b}{a}\right)^2 - \left(\frac{b}{a}\right)^2 + \frac{c}{a}\right)^{N/2}}\,dt =$$

$$P(w)a^{-N/2}\int_{-\frac{b}{a}}^\infty \frac{1}{(q^2 + u^2)^{N/2}}\,dq$$

where $$u^2 = \frac{c}{a}(1 - r^2) = \frac{c}{a}\sin^2\phi \geq 0.$$

Substituting $p=q/u$ followed by $\theta=\tan^{-1} p$ yields:

$$P(w\mid z) \propto P(w)a^{-N/2}\int_{-\frac{b}{a}}^\infty \frac{1}{(q^2+u^2)^{N/2}}\,dq = P(w)a^{-N/2}u^{1-N}\int_{-\frac{b}{au}}^\infty \frac{1}{(p^2+1)^{N/2}}\,dp$$

$$= P(w)a^{-N/2}u^{1-N}\int_{-\tan^{-1}\frac{b}{au}}^{\pi/2} \cos^{N-2}\theta\,d\theta$$

Substituting the appropriate expression for u:

$$P(w\mid z) \propto P(w)a^{-N/2}u^{1-N}\int_{-\tan^{-1}\frac{b}{au}}^{\pi/2}\cos^{N-2}\theta\,d\theta = P(w)a^{-1/2}c^{-\frac{N-1}{2}}(1-r^2)^{\frac{N-1}{2}}\int_{-\tan^{-1}\frac{r}{\sqrt{1-r^2}}}^{\pi/2}\cos^{N-2}\theta\,d\theta$$

$$= P(w)a^{-1/2}c^{-\frac{N-1}{2}}\sin^{-(N-1)}\phi\int_{\phi-\pi/2}^{\pi/2}\cos^{N-2}\theta\,d\theta$$

$$= P(w)a^{-1/2}c^{-\frac{N-1}{2}}\sin^{-(N-1)}\phi\int_{-\pi/2}^{\pi/2-\phi}\cos^{N-2}\theta\,d\theta$$

But c depends only on z, and so the following expression for P(w|z) is obtained:

$$P(w\mid z) \propto P(w) a^{-1/2} \sin^{-(N-1)}\phi \int_{-\pi/2}^{\pi/2-\phi} \cos^{N-2}\theta\, d\theta.$$

In order to determine P(w|z) for a range of w, a, b, c are calculated as above (a and b being calculated for each w, but since a does not depend on z all the necessary values of a can be calculated once and for all when the first rod location is calculated), and hence $\phi$ is can be obtained for each w. All that then remains is to lookup the value of $$\int_{-\pi/2}^{\pi/2-\phi} \cos^{N-2}\theta\, d\theta$$

in a table, as will now be described.

The integral $$\int_{-\pi/2}^{\pi/2-\phi} \cos^{N-2}\theta\, d\theta$$

can be evaluated iteratively, as follows:

Let $Q_n(\phi)$ denote $$\int_{-\pi/2}^{\pi/2-\phi} \cos^n\theta\, d\theta.$$

Then for n>1

$$Q_n(\phi) = \int_{-\pi/2}^{\pi/2-\phi} \cos^n\theta\, d\theta$$

$$= \int_{-\pi/2}^{\pi/2-\phi} \cos^2\theta \cos^{n-2}\theta\, d\theta$$

$$= \int_{-\pi/2}^{\pi/2-\phi} (1-\sin^2\theta)\cos^{n-2}\theta\, d\theta$$

$$= Q_{n-2}(\phi) - \int_{-\pi/2}^{\pi/2-\phi} \sin^2\theta \cos^{n-2}\theta\, d\theta$$

$$= Q_{n-2}(\phi) - \int_{-\pi/2}^{\pi/2-\phi} (\sin\theta)(\sin\theta \cos^{n-2}\theta)\, d\theta$$

Integrating by parts, whereby the second factor is integrated and the first is differentiated yields:

$$Q_n(\phi) = Q_{n-2}(\phi) - \int_{-\pi/2}^{\frac{\pi}{2}-\phi} (\sin\theta)(\sin\theta \cos^{n-2}\theta)\, d\theta$$

$$= Q_{n-2}(\phi) + \frac{1}{n-1}[(\sin\theta)(\cos^{n-1}\theta)]_{-\pi/2}^{\frac{\pi}{2}-\phi} -$$

$$\frac{1}{n-1}\int_{-\pi/2}^{\frac{\pi}{2}-\phi}(\cos\theta)(\cos^{n-1}\theta)\, d\theta$$

-continued $$= Q_{n-2}(\phi) + \frac{1}{n-1}\cos\phi\sin^{n-1}\phi - \frac{1}{n-1}Q_n(\phi)$$

$$\therefore \frac{n}{n-1}Q_n(\phi) = Q_{n-2}(\phi) + \frac{1}{n-1}\cos\phi\sin^{n-1}\phi$$

$$\therefore Q_n(\phi) = \frac{n-1}{n}Q_{n-2}(\phi) + \frac{1}{n}\cos\phi\sin^{n-1}\phi$$

But $Q_1(\theta)=1+\cos\phi$, and $Q_0(\phi)=\pi-\phi$, and thus a recurrence relation can be used to populate the table starting from n=1 and n=0.

The table starts from a value of $r^2=\cos^2\phi$ and the sign of $\phi$, and the values of $\log Q_{N-2}(\phi)$ can be looked up. Accordingly, rather than populate the table based on the values of $\phi$ (for example on a regular grid), the table is populated on a regular grid of $\log(\cos^2\phi)$, keeping two subtables of $\log Q_{N-2}(\phi)$, one for values of positive values of $\cos\phi$, and one for negative. Accordingly, $\log Q_{N-2}(\phi)$ can be represented accurately around values of $\phi$ near $\pi/2$, when $Q_{N-2}(\phi)$ is changing very fast.

Thus, once the posterior distribution on w given z, i.e., P(w|z), is obtained, a likely w having a higher probability value than other w's can be obtained. As noted above, w is related to x, so once a likely w is identified, so is a likely x. Since each x is a subset of markings 12 corresponding to a unique position of rod 10, the most probable x identifies a particular location which is the most likely position of rod 10, and a suitable (Bayesian) confidence interval on the position of rod 10 is obtained.

Processor 18 can be configured to store previous rod positions in memory 19, so that likely values of (i.e., confidence intervals on) velocity, acceleration, and jerk can be obtained. That information, in turn, can be used to set a "prior" on w for the next position measurement, to thereby limit the range of w's for which P(w|z) is calculated.

At the outset, however, rod 10 can be located in any position, as well as any velocity and acceleration within the limits of system 100. Thus, P(w|z) is calculated for each possible w (and thus for each possible rod position). Since each w has a corresponding rod position, P(w|z) must be calculated for each such rod position. For a rod that is several meters long, millions of such calculations are performed by processor 18. After the first measurement, however, the number of possible rod locations is limited to those nearer the initial measurement, and the P(w|z) calculations take less time for subsequent measurements. Moreover, the subsequent measurements can be used to calculate velocity and acceleration, as noted previously, which can be used to further limit the number of possible w's over which P(w|z) is calculated. If the confidence intervals are fairly narrow because the sensed signal to noise ratios are relatively high, successive calculations will take less time because predictions can be made as to which positions are likely and which are not based on previous determinations.

Alternatively, if the rod were to be set at the outset to a particular position or a range of possible positions at each end of the linear path (if for example in FIG. 2, rod 10 were at the outset always retracted within cylinder body 220 so that marking endpoint 250 would be adjacent to reader circuit 26), the initial P(w|z) need only be made over a limited range of rod positions. In addition, as discussed above, further rod positions can be readily determined based on previous calculations.

Consistent with a further aspect of the disclosure, a method is described for calculating the initial location of rod 10 more quickly. In the alternative method (see FIG. 16), typically performed by processor 18, a portion of rod surface 11 is exposed (step 1610) and a sense signal is generated in response to light reflected from rod 10 (step 1620) in a manner similar to that described above. If a position of rod 10 has been previously determined, a set of rod positions can be assumed to be "Possible" within an acceptable distance about the last measured location (step 1622). For example, if rod 10 is in a fully extended position, the next immediate location will not likely be one in which the rod is fully retracted into cylinder 230. Accordingly, locations associated with the retracted position may not be deemed "Possible", while others closer to the fully extended position will be considered "Possible." Alternatively, if in a start-up mode, step 1622 may be omitted.

In step 1624, processor 18 sets a data acceptance filter (data filtering instructions carried out by processor 18) to its most rejecting setting to thereby subject higher or first frequency components of the sensed signal to a first or relatively high deemphasis. In particular, processor 18, in accordance with the data acceptance filtering software or code, obtains data based on low or second frequency components of the sensed signal, which are less likely to change over a given portion of rod surface 11, and are thus indicative of the probability values over a particular region of surface 11. Accordingly, although the rod location might not be identified at this stage, one or more relatively broad regions (albeit not contiguous regions) of rod surface 11 may be identified as likely areas in which the rod location is likely to be found.

In step 1626, a first spatial increment or distance is typically set to its largest value, for example, sixteen times the rod pixel width. In a start-up mode, probability values are determined corresponding to rod locations separated from each other by the spatial increment along the entire length of the rod. If a set of Possible positions is available after step 1622, probability values P(w|z) are calculated at all Possible positions, except those within the increment of each other, i.e., between adjacent increment locations (step 1630). Otherwise, in the start-up mode, probability values are calculated at each increment location along the entire length of the rod.

A determination is made as to whether the acceptance filter is set to an "all-pass" value in which all signal frequency components are considered and the increment has been reduced to the rod pixel width (step 1640). If so, processing continues with step 810 as previously described. Otherwise, one or more sets or groupings of calculated probability values is then determined (step 1660), the sum of each set exceeding a current predetermined threshold (to be discussed below). Those positions whose probability values do not contribute to exceeding the current predetermined threshold are deemed "Not Possible", as well as those positions between any two such "Not Possible" positions separated by an increment. All "Not Possible" positions are not considered further (step 1670).

Figure 16:
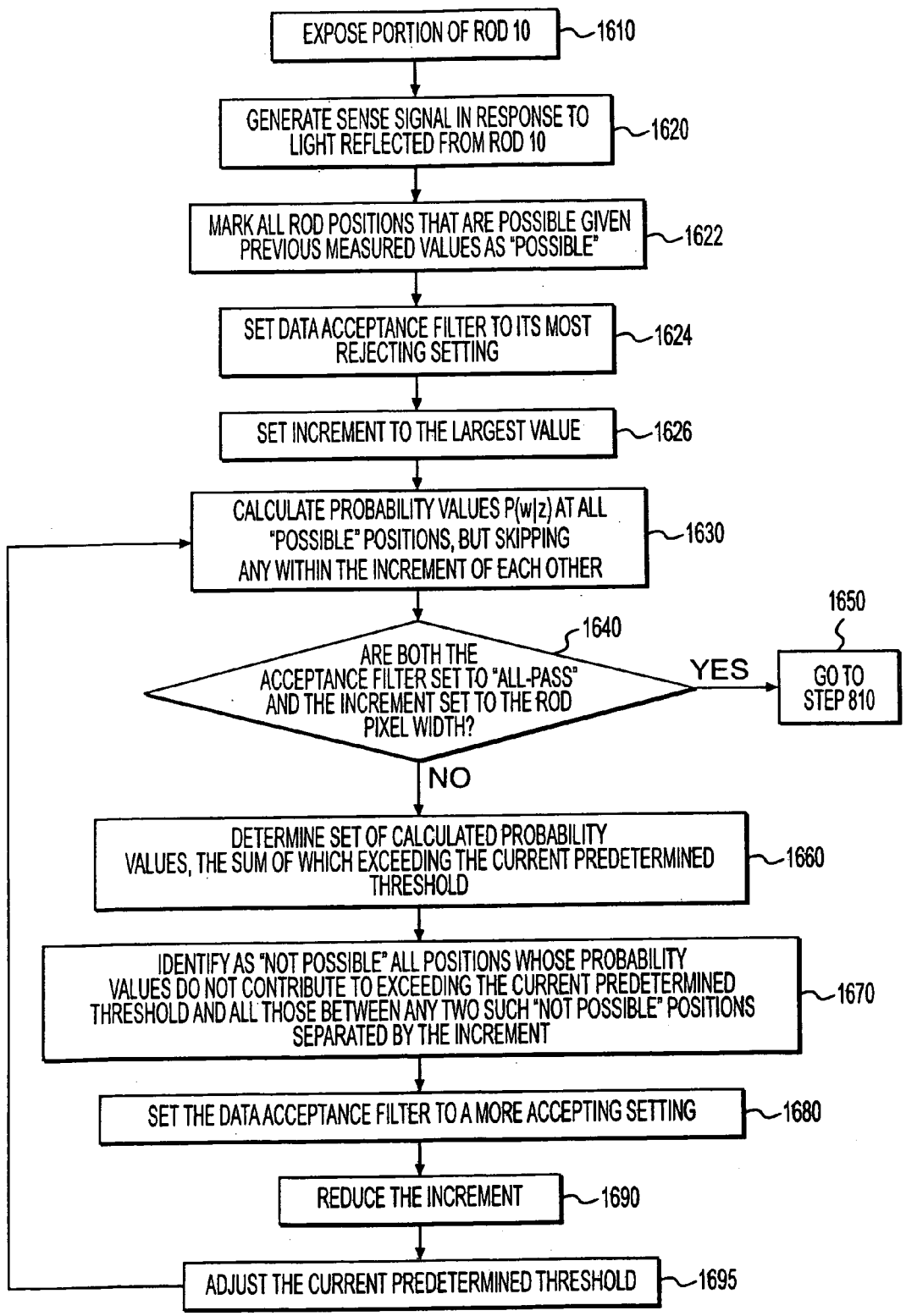
FIG. 16 illustrates an alternative method of determining rod location in accordance with a further aspect of the disclosure.

Thus, after step 1670, in the first iteration of the process shown in FIG. 16, set of probability values defining regions in surface 11 are obtained where the rod location is likely to be found. In addition, all other locations lying outside these regions, which may or may not be contiguous, are not considered further. In the next iteration, the data acceptance filter software is set to a more accepting setting (step 1680), whereby the frequency components of the sensed signal are subject to a second deemphasis less than the first (step 1624). Thus, higher frequency components of the sensed signal are considered by processor 18, and data based on such frequency components is obtained, in addition to data obtained from lower frequency components, as discussed above . Also, probability values are determined at smaller spatial increments (i.e., second distances less than the first distances) within these regions (step 1690), and the current predetermined threshold is reduced (step 1695).

The rationale for including step 1695 will now be explained. At each iteration round the loop in FIG. 16 (steps 1630, 1640, 1660, 1670, 1680, 1690 and 1695), some additional locations are identified as "Not Possible". It is desired that the total probability associated with the totality of these locations so identified not exceed (one minus the predetermined threshold). A number of possible approaches to achieving this are conceivable.

Let us call the predetermined threshold $p_o$. If it is known that (say) 5 iterations round the loop will be done, then one approach is, instead of using $p_o$ as the acceptance threshold each time, to use $$1 - \frac{(1-p_0)}{5}.$$

The total probability discarded in the five iterations is then at most $$\frac{1-p_0}{5} + \left(1 - \frac{1-p_0}{5}\right)\left(\frac{1-p_0}{5}\right) + \left(1 - \frac{1-p_0}{5}\right)^2\left(\frac{1-p_0}{5}\right) + \ldots + \left(1 - \frac{1-p_0}{5}\right)^4\left(\frac{1-p_0}{5}\right)$$

which cannot exceed $1-p_o$, so what remains (in the final triplet, if a satisfactory one exists) must have probability at least $p_o$.

Generally, however, if a threshold $p_k$ is used at the k th iteration with a total of K iterations, in such a way that the part of the rod passed on to the next iteration as still "Possible" has a probability of at least $p_k$ given that the true location was already being considered to be "Possible", then the total discarded probability will not exceed $$\sum_{k=1}^{K}\left(\left(\prod_{k'=1}^{k-1} p_{k'}\right)(1-p_k)\right)$$

so any sequence of thresholds $p_k$ such that $$\sum_{k=1}^{K}\left(\left(\prod_{k'=1}^{k-1} p_{k'}\right)(1-p_k)\right) \le 1 - p_0$$

will achieve the desired effect. The precise choice of this sequence of thresholds will vary from situation to situation, but is made to ensure that as many of the possible rod locations are rejected as early in the processing as possible.

In other words, once a sum of probability values is determined to exceed the current predetermined threshold, the actual rod location can be said to lie within the areas of the rod as defined by the rod locations associated with the summed probability values. Accordingly, for example, if the current predetermined threshold is 0.99, the rod location may be said to be within particular regions on the surface 11 with a 0.99 probability. However, there is a probability of 0.01 that the rod location lies outside these regions. If steps 1630 to 1680 are repeated with a reduced increment, then more narrow regions on surface 11 will be identified as likely to include the rod location, but also there will be additional areas that will not be considered further. Thus, the probability that the rod location lies in one of these non-considered areas increases because the number of these areas increases with each iteration. Thus, step 1695 is provided to adjust the current predetermined threshold according to the adopted sequence of values $p_k$, from $p_k$ to $p_{k+1}$.

After reducing the increment (step 1690), for example, the next smallest increment may be 8 rod pixel widths, and adjusting the current predetermined threshold (step 1695), step 1630 is repeated over the narrower regions discussed above and at smaller increments so that a smaller number of probability values is then calculated followed by remaining steps shown in FIG. 16. This smaller set corresponds to a smaller set of possible rod locations within the range of possible rod locations calculated above, and a group of possible marking subsets based upon the further set of probability values is identified. Steps 1630, 1640, 1660, 1670, 1680, 1690 and 1695 are repeated until all frequency components of the sensed signal are considered, and the increment is set to the narrowest desired value, in this example, the pixel width. At which point, processor 18 performs step 810 (see FIG. 8) and the sum of remaining probability values after the repeated iterations is obtained and a determination is made as to whether the sum exceeds the desired predetermined probability threshold (now the reduced current predetermined threshold). If so, a corresponding marking subset is obtained (step 812), which is then associated with a rod location (step 814), as discussed above. If not, a bad reading is reported and no information is available to restrict the range for the next reading beyond what may already be inferable from preceding measurements, if any.

The method shown in FIG. 16, can be expressed mathematically, as follows. For clarity, the situation is simplified here by assuming V=I, U=0; more complicated real conditions can be incorporated in a conventional manner given the previously shown calculations. Thus, $$B = (AA')^{-\frac{1}{2}}.$$

$\cos\phi_x$ may be written as $$\cos\phi_x = \frac{x'A'B'By}{\sqrt{(x'A'B'BAx)(y'B'By)}}$$
$$= \frac{(A'B'BAx)'(A'B'By)}{\sqrt{((A'B'BAx)'(A'B'BAx))((A'B'By)'(A'B'By))}}$$
$$= \frac{w_x'z}{\sqrt{(w_x'w_x)(z'z)}}$$

where $w_x$ denotes the w vector corresponding to position x on the rod. Note that it is not feasible to store all the $w_x$, however, it is possible to store all the $w_x'w_x$ values.

Now let matrix G represent a low-pass filtering matrix operating on $R^N$ and yielding results in $R^M$ for some M<N, and with the property that GG' is an identity matrix on $R^M$ (e.g. the matrix that first applies a top-hat filter and then downsamples by the corresponding factor). For each x, instead of calculating the value of $\cos\phi_x$ by the previous method based on all the data (i.e. on z), x is calculated instead based on only part of the data, specifically on Gz. $Gw_x$ is first precalculated for each x∈X, and likewise Gz is precalculated.

Then, given only this limited information, P(w|z) is given by the same expression as before, but the expression for $\cos\phi_x$ is replaced by $$\cos\phi_x = \frac{w_x'G'Gz}{\sqrt{(w_x'G'Gw_x)(z'G'Gz)}}.$$

Since M<N, this expression costs correspondingly less to evaluate (given $Gw_x$ and Gz already available). Moreover, since G is a low-pass filter, it is reasonable to suppose that adjacent values of $\cos\phi_x$ will be almost identical—simplifying calculations further. With this approach, however, $Gw_x$ would need to be stored (or, worse, evaluated for each x∈X), which is not feasible.

However, if the additional assumption is made that G'GA' $(AA')^{-1}AG'G \approx G'GA'(AA')^{-1})A$, which is true within around 6% for the particular G being considered, then the above expression simplifies to $$\cos\phi_x \approx \frac{xG'Gz}{\sqrt{(w_x'G'Gw_x)(z'G'Gz)}}$$

which is evaluable using only the stored values of the x∈X and the stored values of $w_x'G'Gw_x$ (which are easier to store). Note that this approximation does not mean that $w_x'G'Gw_x \approx x'G'Gx$, and indeed this is not the case.

Now, assuming a value δ>0 such that it is acceptable to draw a wrong conclusion with probability at most δ>0, and also α value a such that 0<α<1 (e.g. ⅔), the following algorithm can be used to accelerate identification of the initial location of rod 10. G is set to the narrowest-bandwidth low-pass filter being considered and also set $$\gamma = \frac{\alpha\delta}{1-\alpha}.$$

P(w|z) is then evaluated using only the G-restricted information for suitably spaced x∈X (dependent on the particular G) (if G is the identity use the precise formula and full resolution among the remaining x∈X) to remove from further consideration as many x∈X as possible consistent with their total posterior probability being at most γ. If G was not the identity, set G to be the next broader low-pass filter, and γ:=αγ is updated. Then P(w|z) is evaluated, including at higher resolution those x∈X not removed, as well as x∈X that are near those that were not removed, and the process is repeated for the new subset and the new G. The process terminates at the end of the iteration in which G is the identity, and terminates in the same manner as the simpler version of the process described in FIG. 8.

INDUSTRIAL APPLICABILITY

A barcode reader and processing circuitry are disclosed for identifying a position of a cylinder rod that moves along a linear path. The barcode constitutes a series of markings on an outer surface of the rod extending along a substantial portion of the length of the rod. The markings represent encoded information based on numbers calculated with a random number generator, and are grouped into subsets, each of which corresponds to a particular rod position. A portion of the rod including a subset of barcode markings is exposed to light emitted from LEDs in the reader. Light reflected off the barcode is sensed with an array of photosensors provided in the reader. The photosensors generate electrical signals, and using Bayesian probability, a likely subset of markings is determined corresponding to the received electrical signals. Once identified, the markings subset is associated with a location corresponding to the position of the rod.

Although the disclosed embodiments have been described in connection with a rod used in a hydraulic or pneumatic cylinder, the present disclosure can be used to identify the location of other actuated movable members. For example, the disclosure can be used in connection with robotic applications.

As noted above with respect to FIG. 1, the identified rod location can be reported visually to a user on a display in user interface 22. In response to the identified rod location, a user may input commands to control the rod 10. Based on such instructions, processor 18 may provide control signals to mechanical control 20 to actuate rod 10 and a work tool attached thereto in a desired manner.

Alternatively, a user may supply instructions through user interface 22 to processor 18 including parameters for a particular job to be performed by system 100. Once inputted, system 100 can appropriately control rod 10 until the job is completed. For example, if a ditch is to be dug having particular dimensions, such parameters may be input through user interface 22 to processor 18. Throughout the job, processor 18 can monitor the location of rod 10, and thus, assure that system 100 stays within the parameters defined by the user. For example, if the ditch is to be dug to a specified depth, system 100 can monitor how deep a work tool has dug by identifying the position of rod 10, and can thus discontinue further digging once the desired depth has been achieved. Other embodiments of the invention will be apparent to those skilled in the art from consideration of the specification and practice of the invention disclosed herein. It is intended that the specification and examples be considered as exemplary only, with a true scope of the invention being indicated by the following claims.

The invention claimed is:

1. A location monitoring system, comprising:
a movable member, said movable member being movable along a path, said movable member having a surface, and a plurality of markings disposed thereon;
a reader circuit, said reader circuit configured to expose a part of said surface of said movable member to light, and to generate a sense signal in response to a portion of said light emanating from said part of said surface of said movable member, said part of said surface including a subset of said plurality of markings; and
a processor circuit configured to receive said sense signal, and determine a plurality of probability values associated with said sense signal, each of said plurality of probability values being associated with a corresponding subset of said plurality of markings, said processor identifying said subset of said plurality of markings included in said part of said surface based upon at least some of said plurality of probability values, and identifying a position of said movable member along said path corresponding to said identified subset of said plurality of markings.

2. A location monitoring system in accordance with claim 1, wherein said reader includes at least one lens, said lens introducing a blurring distortion in said emanating light, and movement of said movable member introducing blurring distortion in said second radiation.

3. A location monitoring system in accordance with claim 2, wherein said plurality of probability values are represented by P(w|z), P(w|z) satisfying:

$$P(w|z) \propto P(w) a^{-1/2} \sin^{-(N-1)} \phi \int_{-\pi/2}^{\pi/2-\phi} \cos^{N-2} \theta \, d\theta$$

where: P(w|z) is a probability of w given z;
P(w) is a probability of w;

$$w = BAx, \quad B = (AVA' + U)^{-\frac{1}{2}}$$

A is a matrix representing said bluffing distortion and A' is the transpose of A;
x is a vector representing a portion of said selected markings;
V is a covariance matrix associated with a first noise present in said second radiation attributable to said surface;
U is a covariance matrix associated with a second noise present in said sensed signal;
z=By;
y=A(tx+σn$_{rod}$)+σn$_{electronic}$
t is a gain applied to a vector associated with said selected ones of said plurality of markings;
σ is a gain applied to n$_{rod}$;
n$_{rod}$ is a vector of noise values associated with said surface;
n$_{electronic}$ is a vector of noise values associated with said sense signal;
a=w'w;
N is an integer in a range of 1–400;
θ=tan$^{-1}$ p;
p=q/u;

$$q = t - \frac{b}{a};$$

b=w'z, w' is the transpose of w;

$$u^2 = \frac{c}{a} \sin^2 \phi \geq 0;$$

c=z'z, and z' is the transpose of z;
φ is the angle between w and z.

4. A location monitoring system in accordance with claim 1, wherein said movable member is locatable at a plurality of positions over a length of said path, each of said plurality of subsets of said plurality of markings corresponding to a respective one of said plurality of positions along said path.

5. A location monitoring system in accordance with 4, wherein said plurality of markings have first and second end points, and upon an initial activation of said processor circuit, each of said movable member positions is located adjacent to said first or second end points.

6. A location monitoring system in accordance with claim 1, wherein said processor circuit is further configured to store one or more previously identified positions of said movable member along said path.

7. A location monitoring system in accordance with claim 6, wherein said processor circuit is further configured to determine a velocity and acceleration of said movable member based on said position and said stored one or more previously identified positions of said movable member.

8. A location monitoring system in accordance with claim 1, wherein said processor is further configured to identify a subset of said plurality of probability values, the sum of which exceeding a predetermined probability threshold, one of said plurality of probability values within said subset corresponding to said identified subset of said plurality of markings.

9. A location monitoring system in accordance with claim 8, wherein said identified subset of probability values corresponds to a range of locations of said movable member, said range being a desired range of permissible error associated with said identified position of said movable member.

10. A location monitoring system in accordance with claim 9, wherein said identified position of said movable member corresponding to a middle probability value in said set.

11. A location monitoring system in accordance with claim 1, wherein said plurality of probability values are based on Bayesian inference.

12. A location monitoring system, comprising:
a movable member, said movable member being movable along a path, said movable member having a surface, and a plurality of markings disposed thereon, said movable member being locatable at a plurality of positions along said path;

a reader circuit, said reader circuit configured to expose a part of said surface of said movable member, and configured to generate a sense signal in response to light emanating from said part of said surface of said movable member; and a processor circuit configured to receive said sense signal, and determine a plurality of first probability values associated with said sense signal, each of said plurality of first probability values being associated with first locations on said surface, each of said first locations being spaced from one another by a first distance, said processor circuit selecting groupings of said plurality of first probability values, a sum of said selected groupings of said plurality of first probability values exceeding a first predetermined threshold, said processor circuit further being configured to determine a plurality of second probability values, each of said second probability values being associated with second locations on said surface, each of said second locations being spaced from one another by a second distance less than said first distance, and each of said second locations lying within regions of said surface defined by said selected groupings.

13. A location monitoring system in accordance with claim 12, wherein said processor selects groupings of said plurality of second probability values, a sum of said selected groupings of said plurality of second probability values exceeding a second predetermined threshold.

14. A location monitoring system in accordance with claim 12, wherein said processor circuit is configured to subject frequency components associated with said sense signal to a first deemphasis prior to determining said plurality of first probability values, and said processor circuit further being configured to subject said frequency components to a second deemphasis less than said first deemphasis prior to determining said second probability values.

* * * * *